(12) United States Patent
Washiro

(10) Patent No.: US 7,894,770 B2
(45) Date of Patent: Feb. 22, 2011

(54) COMMUNICATION SYSTEM AND COMMUNICATION APPARATUS

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 675 days.

(21) Appl. No.: 11/838,715

(22) Filed: Aug. 14, 2007

(65) Prior Publication Data

US 2008/0153416 A1    Jun. 26, 2008

(30) Foreign Application Priority Data

Sep. 11, 2006    (JP) .............................. 2006-245615
Jun. 4, 2007     (JP) .............................. 2007-148673

(51) Int. Cl.
   *H04B 5/00*    (2006.01)
(52) U.S. Cl. ................. 455/41.1; 343/745; 343/750; 343/790; 343/791; 343/850; 343/853; 343/857; 343/858; 343/860
(58) Field of Classification Search ............. 455/41.1; 343/745, 747, 750, 790–792, 850, 853, 857, 343/858, 860
   See application file for complete search history.

(56) References Cited

U.S. PATENT DOCUMENTS

| | | | |
|---|---|---|---|
| 2,685,068 A | | 7/1954 | Goubau |
| 2,921,277 A | | 1/1960 | Goubau |
| 4,032,845 A | | 6/1977 | Via |
| 4,301,456 A | * | 11/1981 | Lovick, Jr. .................. 343/708 |
| 4,808,950 A | | 2/1989 | Apostolos et al. |
| 5,029,235 A | | 7/1991 | Apostolos et al. |
| 5,555,337 A | | 9/1996 | Hata |
| 5,557,290 A | * | 9/1996 | Watanabe .................... 343/713 |
| 6,614,332 B2 | | 9/2003 | Yamashita et al. |
| 6,677,763 B2 | * | 1/2004 | Geisel ......................... 324/640 |
| 6,753,814 B2 | | 6/2004 | Killen et al. |
| 7,151,497 B2 | * | 12/2006 | Crystal ........................ 343/747 |
| 2002/0175784 A1 | | 11/2002 | Yamashita et al. |
| 2004/0001027 A1 | | 1/2004 | Killen et al. |

FOREIGN PATENT DOCUMENTS

| | | |
|---|---|---|
| JP | 7-175987 | 7/1995 |
| JP | 09-018393 | 1/1997 |

(Continued)

OTHER PUBLICATIONS

Search Report and Opinion from Australian Patent Office dated Nov. 17, 2008, for Singapore Application/Patent No. 200705964-5, 10 pages.

(Continued)

*Primary Examiner*—Tuan A Tran
(74) *Attorney, Agent, or Firm*—Finnegan, Henderson, Farabow, Garrett & Dunner, LLP

(57) ABSTRACT

A communication system includes the following elements: a transmitter including a transmission circuit unit configured to generate an RF signal for transmitting data and an electric-field-coupling antenna configured to transmit the RF signal as an electrostatic field; a receiver including an electric-field-coupling antenna and a reception circuit unit configured to receive and process the RF signal received by the electric-field-coupling antenna; and a surface-wave propagation medium configured to provide a surface-wave transmission line to transmit a surface wave emanating from the electric-field-coupling antenna of the transmitter with low propagation loss.

14 Claims, 34 Drawing Sheets

FOREIGN PATENT DOCUMENTS

| | | |
|---|---|---|
| JP | 10-303114 | 11/1998 |
| JP | 2002-135013 | 5/2002 |
| JP | 2002-353708 | 12/2002 |
| JP | 2002-353709 | 12/2002 |
| JP | 2003-115707 | 4/2003 |
| JP | 2003-163644 | 6/2003 |
| JP | 2004-147291 | 5/2004 |
| JP | 2004-200941 | 7/2004 |
| JP | 2004-214879 | 7/2004 |
| JP | 2004-361276 | 12/2004 |
| JP | 2005-18671 | 1/2005 |
| JP | 2005-217962 | 8/2005 |
| JP | 2006-60283 | 3/2006 |
| JP | 2006-106612 | 4/2006 |
| JP | 2006-148674 | 6/2006 |
| JP | 2006-190215 | 7/2006 |
| JP | 2007-054474 | 3/2007 |
| JP | 2008-99234 | 4/2008 |

OTHER PUBLICATIONS

Tasuku Teshirogi et al., "Modern Millimeter-Wave Technologies", Ohmsha, pp. 119.

Akitoshi Toshimi, "A Study of Surface Wave Propagating Two Parallel Ferrite Rods". Shizuoka University.

Mushiake Yasuto, "Antenna, Radio Wave Propagation" Coronasha, pp. 16-18.

Masamitsu Nakajima, "Microwave Engineering", Morikita Publishing Company, p. 182-190.

* cited by examiner

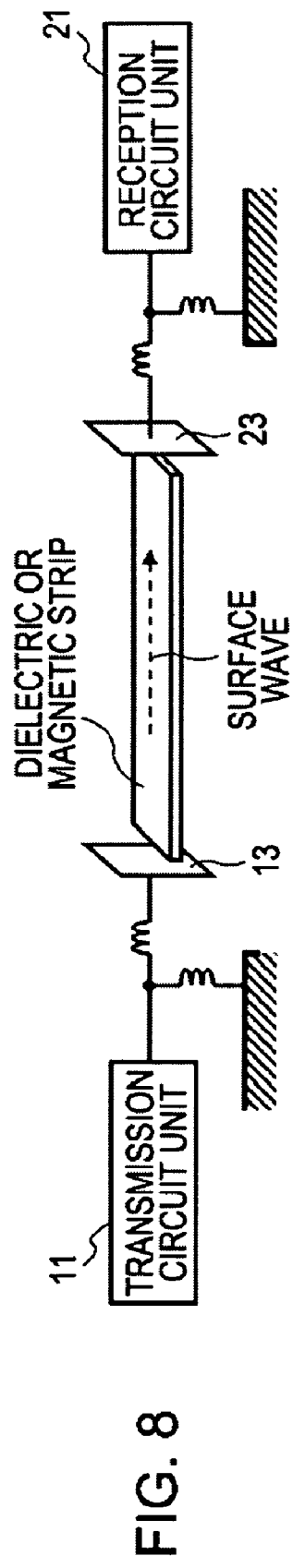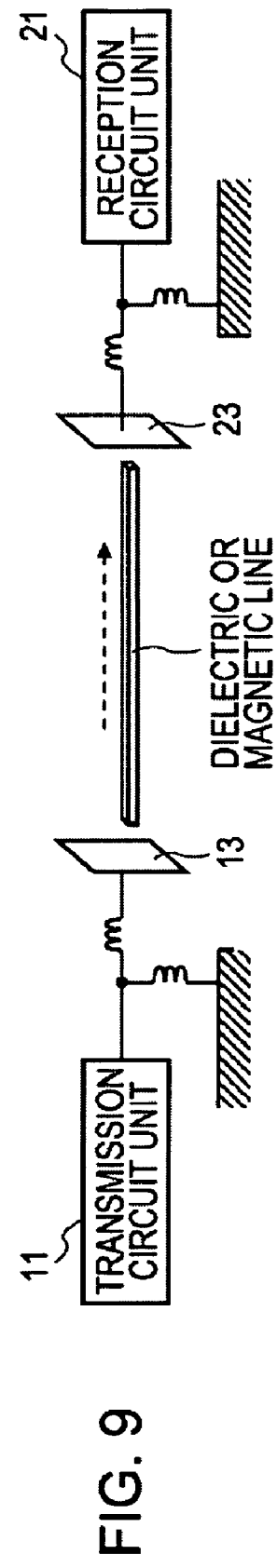
FIG. 8
FIG. 9

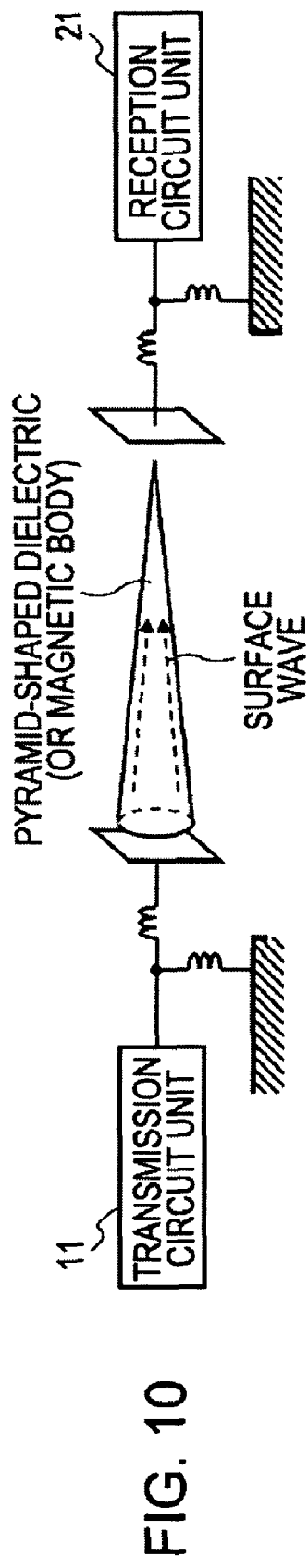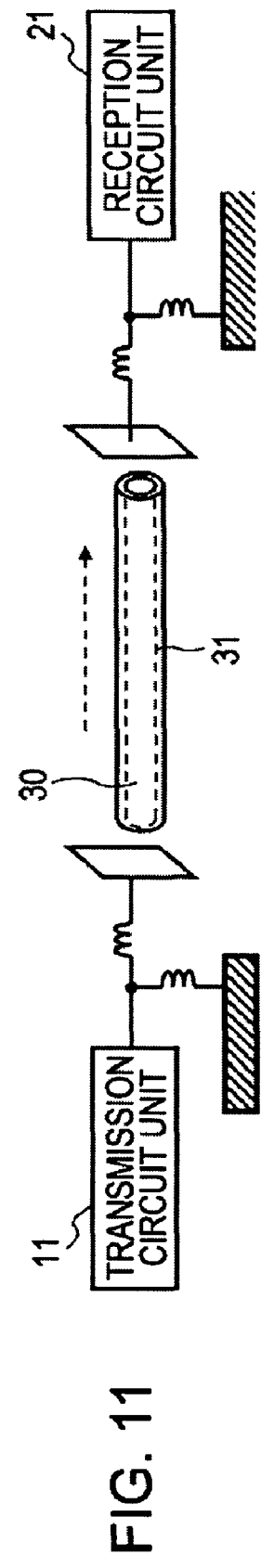

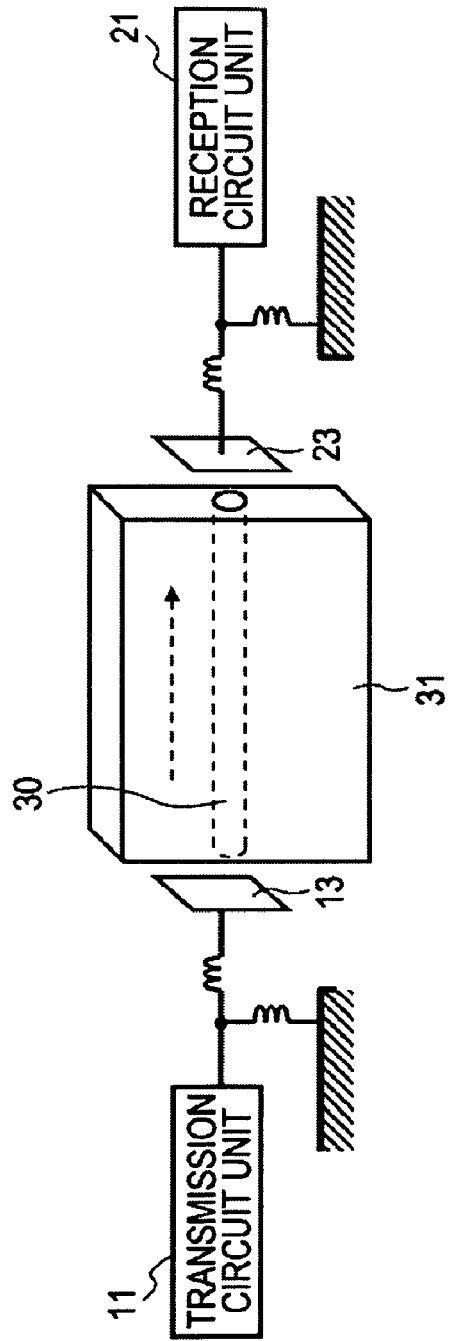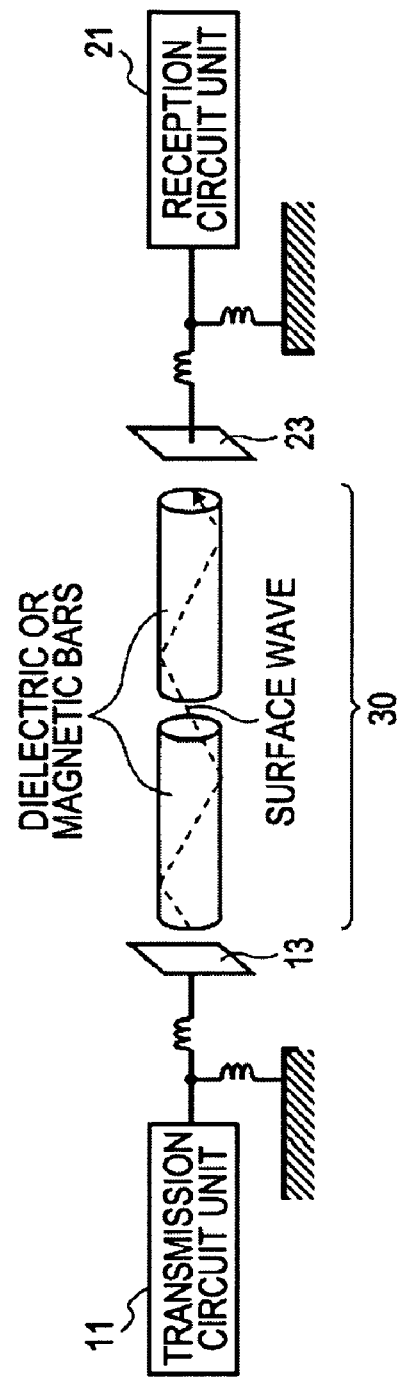
FIG. 13
FIG. 14

FIG. 17B
PPS (POLYPHENYLENE SULFIDE RESIN)
- DIELECTRIC CONSTANT: 5—12
- DIELECTRIC LOSS TANGENT: 0.002
 ↕ 10 mm
MAGNETIC BODY (NiZn FERRITE)
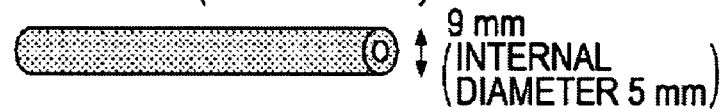 ↕ 9 mm (INTERNAL DIAMETER 5 mm)
MAGNETIC BODY (MAGNET)
 ↕ 6 mm
FIG. 17C
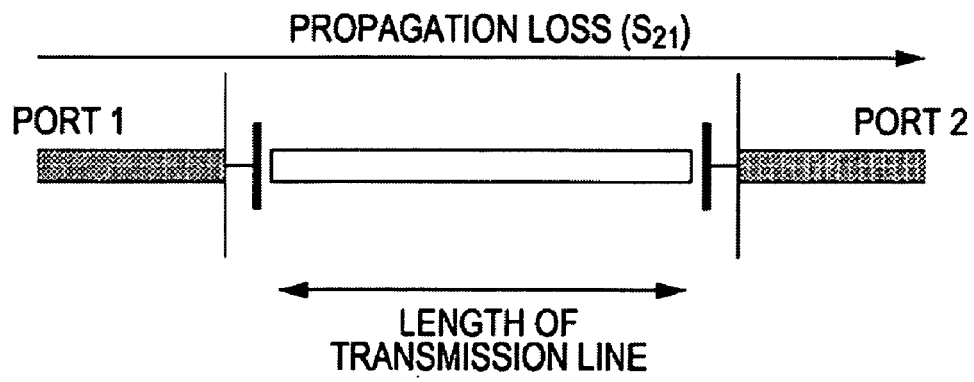

NO WAVE IS REFLECTED IN THE CASE OF MATCHED IMPEDANCES

FIG. 30
| ELECTRIC-FIELD DISTRIBUTION | MAGNETIC-FIELD DISTRIBUTION |
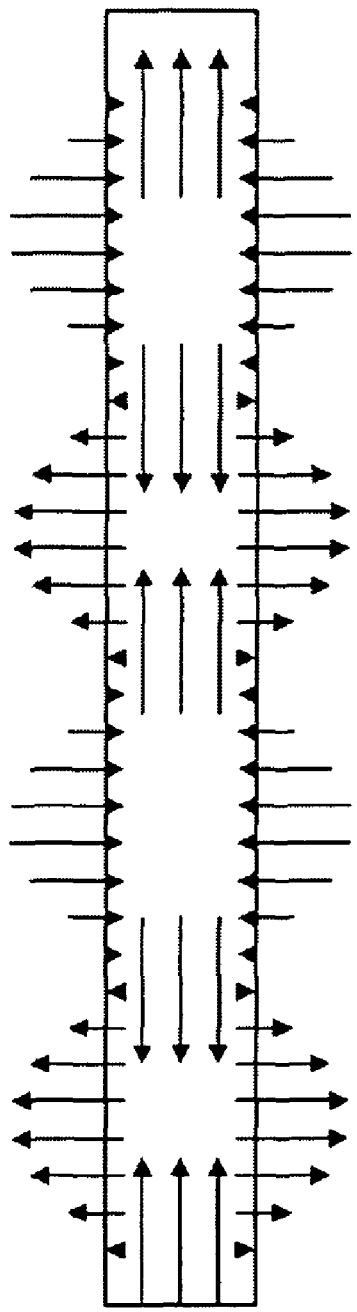 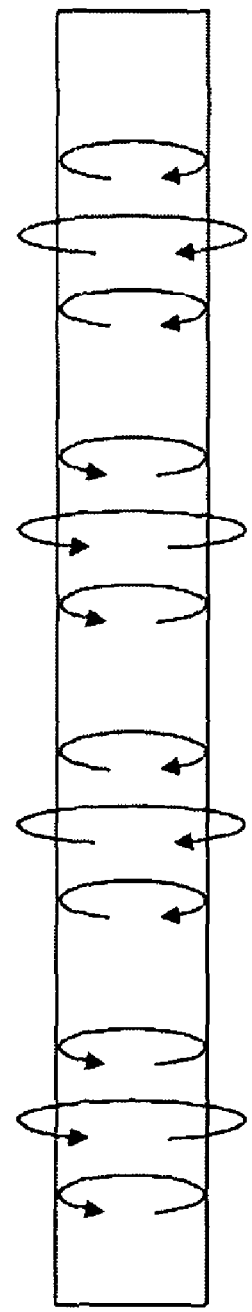

COMMUNICATION SYSTEM AND COMMUNICATION APPARATUS

CROSS REFERENCES TO RELATED APPLICATIONS

The present invention contains subject matter related to Japanese Patent Application JP 2006-245615 filed in the Japanese Patent Office on Sep. 11, 2006, and Japanese Patent Application JP 2007-148673 filed in the Japanese Patent Office on Jun. 4, 2007, the entire contents of which are incorporated herein by reference.

BACKGROUND OF THE INVENTION

1. Field of the Invention

The present invention relates to communication systems for communicating a large amount of data between information devices, and more particularly to a communication system for performing data communication between information devices without interfering with other communication systems by using an electrostatic field (quasi-electrostatic field) or an induced electric field.

More specifically, the present invention relates to a communication system for implementing high-capacity transmission of radio-frequency (RF) signals by using electric field coupling, and more particularly to a communication system for making the arrangement between a transmitter and a receiver and the design of a communication apparatus flexible by expanding the distance between electrodes, which are provided to achieve electric-field coupling, of the transmitter and the receiver.

2. Description of the Related Art

Recently, the use of wireless interfaces in transferring data between small information devices, such as when image data or music data is exchanged between a small information device and a personal computer (PC), is becoming more widespread in place of data transmission using a general cable, such as an audio/visual (AV) cable or a universal serial bus (USB) cable, to interconnect the information devices or using a medium such as a memory card. Wireless interfaces are user-friendlier because they do not involve the reconnection of connectors and the wiring of a cable every time data transmission is performed. Various information devices having cableless communication functions are now available.

As methods of cableless data transmission between small devices, besides wireless local area networks (LANs) represented by the Institute of Electrical and Electronics Engineers (IEEE) 802.11 and Bluetooth®, radio communication schemes of performing transmission/reception of radio signals using antennas have been developed. For example, a proposal has been made for a portable image recording apparatus containing an internal antenna placed at a position not covered with a hand holding a grip (for example, see Japanese Unexamined Patent Application Publication No. 2006-106612). Since the internal antenna is not covered with the hand, correct image data is received. Even in the case where the antenna for wireless communication is placed inside the apparatus, the antenna can exert its characteristics.

Many known wireless communication systems employ radio communication schemes and allow signals to propagate using a radiated electric field generated in the case where current flows through an aerial (antenna). In this case, a transmitter side emits radio waves regardless of the presence of a communication partner. This may generate jamming waves which disturb the neighboring communication systems. An antenna at a receiver side receives not only desired waves from the transmitter, but also radio waves arriving from far away. Thus, the antenna at the receiver side is susceptible to the influence of ambient jamming waves, resulting in a reduction of the reception sensitivity. In the case where a plurality of communication partners exists, a complicated setting is necessary to be done in order to select a desired communication partner from the plurality of communication partners. For example, in the case where a plurality of pairs of wireless devices perform wireless communication within a narrow range, division multiplexing such as frequency selection is necessary to be done in order to perform communication that does not interfere with other pairs of wireless devices. Since a radio wave perpendicular to the direction of polarization is not communicated, the directions of polarization of the antennas of the transmitter and the receiver are necessary to be aligned.

For example, in the case of a contactless data communication system in which communication is performed within a very short distance from a few millimeters to a few centimeters, it is preferable that the transmitter and the receiver be coupled strongly within a short distance, but a signal not reach across a long distance in order to avoid interference with other systems. It is also preferable that data communication devices be coupled with each other regardless of the orientations (directions) thereof in the case where the data communication devices are placed in close proximity with each other, that is, it is preferable that the devices have no directivity. In order to perform high-capacity data communication, it is preferable that the devices can perform broadband communication.

In wireless communication, besides the above-mentioned radio communication using a radiated electric field, various communication schemes using an electrostatic field or an induced electric field are available. For example, an electric-field coupling scheme or an electromagnetic-induction scheme is employed in existing contactless communication systems mainly used in radio frequency identification (RFID). An electrostatic field or an induced electric field is inversely proportional to the square or the cube of the distance from the source thereof. In this type of contactless communication system, a transmission signal is rapidly attenuated according to the distance. In the case where no nearby communication partner exists, no coupling relationship occurs, and hence other communication systems are not disturbed. Even in the case where radio waves arrive from far away, an electric-field-coupling antenna (hereinafter called "EFC antenna") receives no radio waves, and hence the present system is not interfered with by other communication systems.

For example, a proposal for an RFID tag system has been made (for example, see Japanese Unexamined Patent Application Publication No. 2006-60283). In this system, pairs of communication auxiliary units are arranged so that RFID tags are positioned between a plurality of communication auxiliary units. By arranging RFID tags attached to a plurality of merchandise items so as to be sandwiched between the communication auxiliary units, stable reading and writing of information can be implemented even in the case where RFID tags overlap one another.

A proposal for a data communication apparatus using an induced magnetic field has been made (for example, see Japanese Unexamined Patent Application Publication No. 2004-214879). The apparatus includes a main body, a mounting tool configured to mount the main body to a physical body of a user, an antenna coil, and a data communication unit configured to perform contactless data communication with an external communication apparatus via the antenna coil. The antenna coil and the data communication unit are placed on an outer casing provided above the main body of the apparatus.

A proposal has been made for a cellular phone, which is en exemplary portable information device, provided with an RFID, which ensures a communication distance without sacrificing the portability (for example, see Japanese Unexamined Patent Application Publication No. 2005-18671). A memory card to be inserted into the portable information device includes an antenna coil configured to perform data communication with an external device. An RFID antenna coil is provided in the exterior of a memory-card insertion slot of the portable information device.

Because known RFID systems employing an electrostatic field or an induced electric field use lower-frequency signals, the systems communicate at a low speed and are thus not suitable for high-capacity data transmission. In contrast, the inventor of the present invention believes that high-capacity transmission can be implemented by transferring higher-frequency signals using electric-field coupling.

The strength of a radiated electric field is gradually attenuated in inverse proportion to the distance. In contrast, the strength of an induced electric field or an electrostatic field is rapidly attenuated in inverse proportion to the square or the cube of the distance. That is, a signal is greatly attenuated according to the communication distance. A propagation loss is defined according to the propagation distance relative to the wavelength. In the case of transmitting an RF signal using electric-field coupling, the problem of the propagation loss according to the interelectrode distance becomes striking. It is thus necessary to attach coupling electrodes of a transmitter and a receiver as much as possible. This involves fine alignment of the electrodes. During data communication, the positions of the electrodes are necessary to be maintained, which is inconvenient for a user. Also, the transmitter and the receiver have difficulty in performing direct communication over a long distance.

In the case where each of the coupling electrodes is mounted inside the casing of the communication apparatus, it is necessary to place each electrode as close to the outside of the casing as possible in order to reduce the interelectrode distance during data communication. This limits the degree of freedom in designing the layout of the casing. The coupling electrodes are preferably small and inexpensive.

SUMMARY OF THE INVENTION

It is desirable to provide an excellent communication system that can perform data communication between information devices using an electrostatic field or an induced electric field without interfering with other communication systems.

It is also desirable to provide an excellent communication system that can perform high-capacity data transmission of RF signals by employing a communication scheme using an electrostatic field or an induced electric field.

It is also desirable to provide an excellent communication system that can make the arrangement between a transmitter and a receiver and the design of a communication apparatus flexible by expanding the distance between coupling electrodes of the transmitter and the receiver.

According to an embodiment of the present invention, there is provided a communication system including the following elements: a transmitter including a transmission circuit unit configured to generate an RF signal for transmitting data and an EFC antenna configured to transmit the RF signal as an electrostatic magnetic field; a receiver including an EFC antenna and a reception circuit unit configured to receive and process the RF signal received by the EFC antenna; and surface-wave propagation means configured to provide a surface-wave transmission line to transmit a surface wave emanating from the EFC antenna of the transmitter with low propagation loss.

The "system" mentioned here refers to a logical assembly of a plurality of devices (or function modules that realize specific functions) and does not make any distinction between whether or not the devices or the function modules are contained in a single casing (the same applies hereinafter).

User-friendliness is improved in the case where data transfer between small information devices, such as when data including images or music is exchanged between a small information device and a PC, is implemented in a cableless manner. However, many wireless communication systems represented by wireless LANs use a radiated electric field generated by allowing current to flow through an antenna. Therefore, radio waves are emitted regardless of the presence of a communication partner. Since the radiated electric field is attenuated gradually in inverse proportion to the distance from the antenna, a signal reaches relatively far. This may generate jamming waves which disturb the neighboring communication systems. Due to the surrounding jamming waves, the sensitivity of an antenna at a receiver side is reduced. In short, it is difficult to implement wireless communication using a radio communication scheme in which a communication partner is limited to that located at a very short distance.

In contrast, in a communication system using an electrostatic field or an induced electric field, no coupling relationship occurs in the case where no nearby communication partner exists. The strength of an induced electric field or an electrostatic field is rapidly attenuated in inverse proportion to the square or the cube of the distance from the source thereof. That is, no unnecessary electric fields are generated, and electric fields do not reach far, whereby other communication systems are not disturbed. Even in the case where radio waves arrive from far away, the coupling electrode receives no radio waves, and hence the system is not interfered with by other communication systems.

Known contactless communication systems using an electrostatic field or an induced electric field are not suitable for high-capacity data transmission since they use lower-frequency signals. The inventor of the present invention believes that, even in this type of contactless communication system, high-capacity data transmission can be implemented by using higher-frequency signals.

The strength of an induced electric field or an electrostatic field is rapidly attenuated in inverse proportion to the square or the cube of the distance. The use of RF signals, which have short wavelengths, leads to a large propagation loss. It is therefore necessary to attach the coupling electrodes of the transmitter and the receiver as much as possible, meaning that communication over a long distance is difficult. In order to place the coupling electrodes sufficiently close to each other, the electrodes are necessary to be aligned in a very fine manner. The positions of the electrodes are necessary to be maintained during data communication, which is inconvenient for a user.

In contrast, the communication system according to the embodiment of the present invention employs a communication scheme of transmitting an RF signal using electric-field coupling. Since the surface-wave propagation means transfers a surface wave emanating from the coupling electrode of the transmitter, data transmission can be implemented without bringing the electrodes of the transmitter and the receiver sufficiently close to each other or without performing very fine alignment of the electrodes.

The surface-wave propagation means includes, for example, a line-shaped dielectric or magnetic surface-wave transmission line. The surface-wave transmission line is disposed along the direction of travel of a longitudinal wave of an electromagnetic wave emanating from the coupling electrode of the transmitter. Such a surface-wave transmission line allows a surface wave to efficiently propagate inside and on the surface of the transmission line. Compared with the case where a surface wave propagates in free space where no surface-wave transmission line is disposed, the propagation loss can be reduced since the surface-wave transmission line is interposed between the EFC antennas of the transmitter and the receiver. In the case of contactless transmission, it is no longer necessarily for the user to directly attach the coupling electrodes of the transmitter and the receiver to each other.

The surface-wave transmission line may include, for example, a dielectric with a dielectric constant $\in$ greater than a dielectric constant $\in_0$ of air. In such a case, a surface wave in the dielectric propagates parallel to the interface and is totally reflected at the interface. In the case where a surface wave is incident on the interior of the dielectric at an appropriate angle, the surface wave propagates efficiently without any loss while being repeatedly reflected at the interface between the inside and the outside of the dielectric.

The surface-wave transmission line may include a dielectric whose dielectric constant becomes greater toward an inner part thereof. For example, the surface of a dielectric with a higher dielectric constant may be covered with another dielectric layer with a lower dielectric constant. In this case, the amount of a surface wave which propagates in the surface-wave transmission line and emanates to the outside as a transmitted wave can be suppressed, and a signal can be transmitted more efficiently. For example, the surface-wave transmission line may be embedded in a rack including another dielectric with a lower dielectric constant.

Alternatively, the surface-wave transmission line may include a magnetic body with a magnetic permeability $\mu$ greater than a magnetic permeability $\mu_0$ of air. In this case, a surface wave in the magnetic body travels parallel to the interface and is totally reflected at the interface. Therefore, in the case where a surface wave is incident on the interior of the magnetic body at an appropriate angle, the surface wave propagates efficiently without any loss while being repeatedly reflected at the interface between the inside and the outside of the magnetic body.

The surface-wave transmission line may include a magnetic body whose magnetic permeability becomes greater toward an inner part thereof. For example, the surface of a magnetic body with a higher magnetic permeability may be covered with another magnetic layer with a lower magnetic permeability. Accordingly, the amount of a surface wave which propagates in the surface-wave transmission line and emanates to the outside as a transmitted wave can be suppressed, and a signal can be transmitted more efficiently. For example, the surface-wave transmission line may be embedded in a rack including another magnetic body with a lower magnetic permeability.

The surface-wave transmission line may include a plurality of separate dielectrics or magnetic bodies, instead of one dielectric or magnetic body. That is, the surface-wave transmission line can be electrically separated into portions, and the separate portions can be used without touching each other. Therefore, the communication system can be applied to contactless communication in which devices or a device and a member do not have a physical contact with each other. In this case, the separate dielectric (or magnetic) portions are not necessarily in contact with each other; it is preferable that the gap between the separate dielectric (or magnetic) portions be as small as possible in order to reduce loss, and that the separate portions be placed such that signal transmission faces thereof can face each other.

According to the layout inside casings where the transmission/reception circuit units and the coupling electrodes are mounted on respective main circuit boards in communication devices, in the case where nothing is placed in front of each electrode, which is housed deep inside a corresponding casing, a signal emitted from the electrode is dispersed in air in the casing and is lost. In contrast, in the case where a dielectric or a magnetic body serving as a surface-wave transmission line is disposed in front of each coupling electrode, an electromagnetic-field signal emitted from the coupling electrode is guided by the surface-wave transmission line to the surface of the casing, whereby the signal can be transmitted efficiently.

In the transmitter, an RF-signal transmission line configured to transmit an RF signal generated by the transmission circuit unit is connected to substantially the center of the electrode of the EFC antenna via a resonating section which resonates at a predetermined frequency. In the receiver, an RF-signal transmission line configured to transmit an RF signal to the reception circuit unit is connected to substantially the center of the electrode of the EFC antenna via a resonating section which resonates at a predetermined frequency.

Each of the resonating sections may include a lumped-constant circuit. More specifically, each resonating section includes a parallel inductor connected between a signal line of the RF transmission line and ground and a series inductor connected between the signal line of the RF transmission line and the electrode. Alternatively, each resonating section may include a distributed-constant circuit. More specifically, a conductive pattern with a length dependent on the operating wavelength (which may also be referred to as a "stub") is formed on a printed circuit board on which the EFC antenna is mounted, thereby operating as a resonating section.

According to the embodiments of the present invention, there is provided an excellent communication system that can perform data communication between information devices using an electrostatic field or an induced electric field without interfering with other communication systems.

According to the embodiments of the present invention, there is provided an excellent communication system which can implement high-capacity data transmission of RF signals by employing a communication scheme using an electrostatic field or an induced electric field.

According to the embodiments of the present invention, there is provided an excellent communication system which can make the arrangement between a transmitter and a receiver and the design of a communication apparatus flexible by expanding the distance between coupling electrodes of the transmitter and the receiver.

In the communication system according to the embodiment of the present invention, the surface-wave propagation means transfers a surface wave emanating from the coupling electrode of the transmitter in an efficient manner with low propagation loss. When performing data communication, it is no longer necessarily for a user to directly attach the coupling electrodes of the transmitter and the receiver to each other, whereby data communication over a long distance can be performed using electric-field coupling.

In the communication system according to the embodiment of the present invention, it is no longer necessary to finely align the electrodes for electric-field coupling such that the electrodes can be placed sufficiently close to each other.

Further, it becomes unnecessary to place the electrodes as close to the outside of the casing of the communication apparatus as possible. Therefore, the degree of freedom in designing the layout of the casing is increased.

In the communication system according to the embodiment of the present invention, the coupling electrodes of the transmitter and the receiver can be out of contact with the surface-wave transmission line provided by the surface-wave propagation means, or the surface-wave transmission line can be separated into portions and the separate portions can be used without touching each other. The communication system can thus be applied to contactless communication in which devices or a device and a member do not have a physical contact with each other.

In the communication apparatus according to the embodiment of the present invention, a surface wave emanating from the coupling electrode can be guided by the surface-wave transmission line to an easy-to-use position. It thus becomes unnecessary to place the coupling electrode near the exterior of the casing of the communication apparatus. Therefore, the degree of freedom in mounting components and in designing the layout of the casing is increased.

Further features and advantages of the present invention will become apparent from the following description of exemplary embodiments with reference to the attached drawings.

BRIEF DESCRIPTION OF THE DRAWINGS

FIG. 8 is a diagram of an exemplary surface-wave transmission line formed as a strip;

FIG. 9 is a diagram of an exemplary surface-wave transmission line formed as a line;

FIG. 10 is a diagram of an exemplary surface-wave transmission line having a pyramid shape;

FIG. 11 is a diagram of an exemplary structure in which the surface of a dielectric surface-wave transmission line with a higher dielectric constant is covered with another dielectric layer with a lower dielectric constant;

FIG. 13 is a diagram of a dielectric surface-wave transmission line with a higher dielectric constant, which is embedded in another dielectric with a lower dielectric constant;

FIG. 14 is a diagram of a surface-wave transmission line including, instead of one dielectric (or magnetic body), a plurality of separate dielectrics (or magnetic bodies);

FIG. 17B illustrates materials used in a surface-wave transmission line;

FIG. 17C illustrates a propagation loss;

FIG. 30 illustrates the distribution of electric fields and the distribution of magnetic fields generated around a dielectric surface-wave transmission line;

DESCRIPTION OF THE PREFERRED EMBODIMENTS

Figure 1:
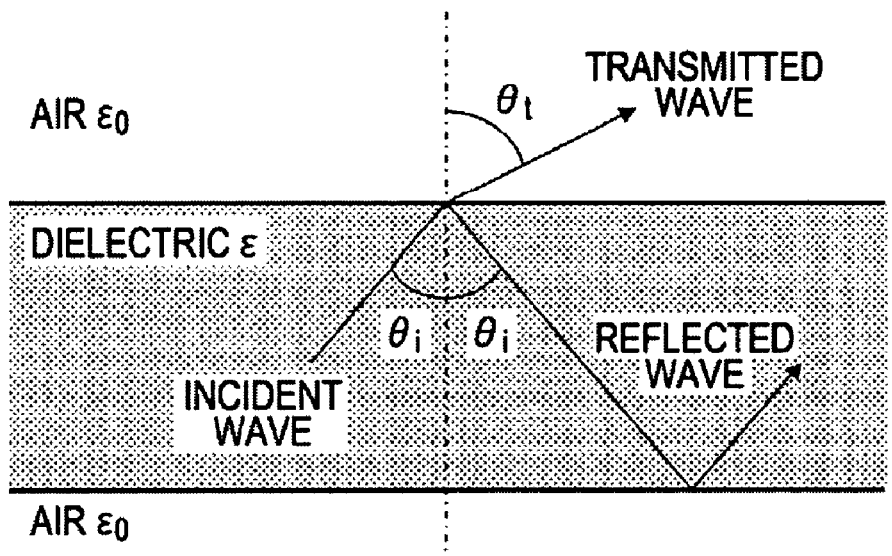
FIG. 1 illustrates the propagation of a surface wave in a dielectric surface-wave transmission line.

Preferred embodiments of the present invention will now herein be described in detail below with reference to the drawings.

The present invention relates to a communication system for performing data transmission between information devices using an electrostatic field or an induced electric field. According to a communication scheme based on an electrostatic field or an induced electric field, no radio waves are emitted in the absence of communication partners nearby since no coupling relationship occurs, and hence other communication systems are not disturbed. Even in the case where radio waves arrive from far away, an EFC antenna receives no radio waves, and hence the communication system is not interfered with by other communication systems.

In known radio communication using antennas, the strength of a radiated electric field is inversely proportional to the distance. In contrast, the strength of an induced electric field is attenuated in inverse proportion to the square of the distance, and the strength of an electrostatic field is attenuated in inverse proportion to the cube of the distance. According to a communication scheme based on the electric-field coupling, very weak radio waves merely causing noise for other wireless systems existing in the neighborhood can be emitted, and hence the licensing of a radio station becomes unnecessary.

Although an electrostatic field changing with time may be referred to as a "quasi-electrostatic field", this is also included in an "electrostatic field" in this specification.

Since known communication employing an electrostatic field or an induced electric field uses lower-frequency signals, the known communication is unsuitable for transferring a large amount of data. In contrast, a communication system according to an embodiment of the present invention transfers higher-frequency signals using the electric-field coupling, and hence the communication system can transfer a large amount of data. More specifically, as in ultra-wideband (UWB) communication, a communication scheme using high frequencies over a wideband is applied to the electric-field coupling, thereby implementing high-capacity data communication using very weak radio waves.

The UWB communication uses a very wide frequency band from 3.1 GHz to 10.6 GHz and implements, though over a short distance, wireless transmission of a large amount of data at a rate of approximately 100 Mbps. The UWB communication is a communication technology originally developed as a radio communication scheme using antennas. For example, in IEEE 802.15.3 or the like, the scheme of transmitting data having a packet structure including a preamble is designed as an access control scheme in the UWB communication. Intel Corporation in the United States is studying, as a UWB application, a wireless version of USB, which has been widely used as a general interface for PCs.

UWB transmission systems using a UWB low-band from 3.1 GHz to 4.9 GHz have been actively developed taking into consideration that the UWB communication can transfer data at a rate exceeding 100 Mbps without occupying a transmission band from 3.1 GHz to 10.6 GHz, and the simplicity of fabricating an RF circuit. The inventor of the present invention believes that a data transmission system employing a UWB low-band is one of effective wireless communication techniques to be applied to mobile devices. For example, high-speed data transmission in a short-distance area, such as an ultra-high-speed, short-distance device area network (DAN) including a storage device, can be implemented.

The inventor of the present invention believes that, according to a UWB communication system employing an electrostatic field or an induced electric field, data communication using a very weak electric field can be implemented. The inventor also believes that, according to such a UWB communication system, a large amount of data, such as a moving image or music data contained in one compact disc (CD), can be transferred at high speed in a short period of time.

Figure 19:
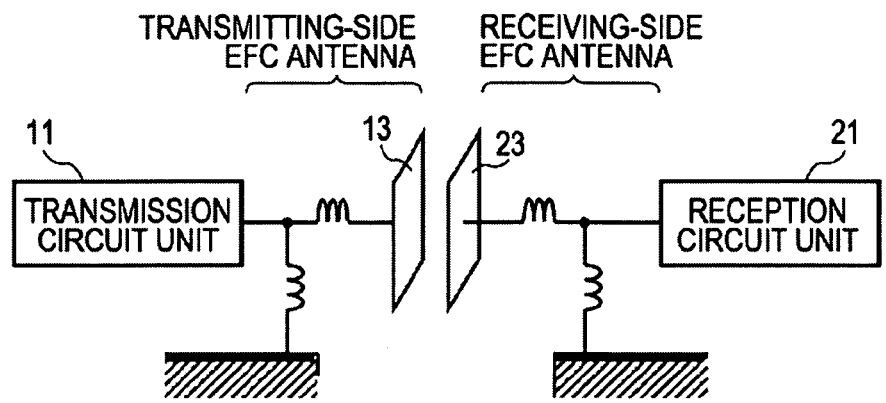
FIG. 19 is a diagram of an exemplary configuration of a contactless communication system using an electrostatic field or an induced electric field.

FIG. 19 shows an exemplary configuration of a contactless communication system using an electrostatic field or an induced electric field. The communication system illustrated in the drawing includes a transmitter 10 configured to perform data transmission and a receiver 20 configured to perform data reception.

A transmission electrode 13 of the transmitter 10 and a reception electrode 23 of the receiver 20 are arranged facing each other with a gap of, for example, 3 cm, and hence can produce electric-field coupling. In response to a transmission request issued from an upper application, a transmission circuit unit 11 of the transmitter 10 generates an RF transmission signal, such as a UWB signal, on the basis of transmission data, and the signal propagates from the transmission electrode 13 to the reception electrode 23. A reception circuit unit 21 of the receiver 20 demodulates and decodes the RF signal received to reproduce data and transfers the reproduced data to the upper application.

According to a communication scheme using high frequencies over a wideband as in the UWB communication, ultra-high speed data transmission at a rate of approximately 100 Mbps can be implemented over a short distance. In the case where the UWB communication is performed using electric-field coupling instead of performing radio communication, the strength of the electric field is in inverse proportion to the cube or the square of the distance. By controlling the strength of the electric field (strength of radio waves) over a distance of 3 m from a wireless facility to be less than or equal to a predetermined level, very weak radio waves can be emitted, and hence the licensing of a radio station becomes unnecessary. Therefore, an inexpensive communication system can be implemented. In the case of very-short-distance data communication using an electric-field coupling scheme, the quality of a signal is not deteriorated due to a neighboring reflector. Further, it is also unnecessary to take into consideration prevention of hacking on a transmission line and securing of confidentiality.

In contrast, the propagation loss increases with the propagation distance relative to the wavelength. In order to allow an RF signal to propagate using electric-field coupling, the propagation loss is necessary to be reduced to a sufficiently small value. In the communication scheme of transmitting an RF wideband signal, such as a UWB signal, using electric-field coupling, communication over a very short distance of approximately 3 cm corresponds to approximately one-half the wavelength of an operating frequency of 4 GHz. Thus, such a very short distance should not be neglected. Particularly, the characteristic impedance causes a more serious problem in a higher-frequency circuit than in a lower-frequency circuit. An impedance mismatch at a coupling point between electrodes of a transmitter and a receiver has a more striking effect in a higher-frequency circuit.

Known contactless communication using frequencies of kHz or MHz has a small propagation loss in space. Thus, in the case where a transmitter and a receiver each have an EFC antenna including only an electrode and a coupling portion simply operates as a plane parallel capacitor, desired data transmission can be performed. In contrast, contactless communication using higher frequencies of GHz has a large propagation loss in space. It is thus necessary to suppress signal reflection in coupling electrodes of a transmitter and a receiver and to improve transmission efficiency. In the communication system illustrated in FIG. 19, even in the case where an RF-signal transmission line connecting the transmission circuit unit 11 to the transmission electrode 13 is a coaxial line with a matched impedance of, for example, 50Ω, in the case of an impedance mismatch in a coupling portion between the transmission electrode 13 at the transmitting side and the reception electrode 23 at the receiving side, a signal is reflected to incur propagation loss.

Figure 20:
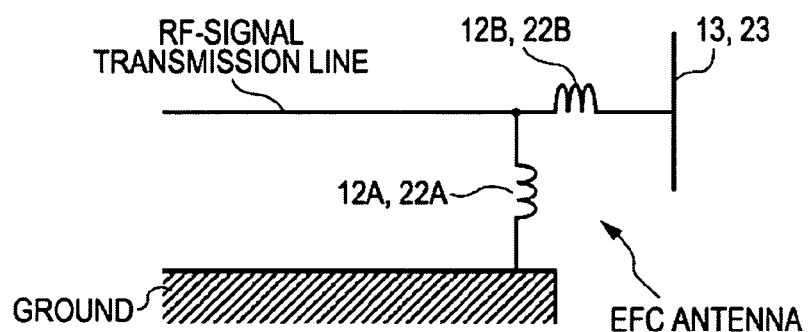
FIG. 20 is a diagram of an exemplary structure of an EFC antenna placed in each of the transmitter 10 and a receiver 20.
Figure 21:
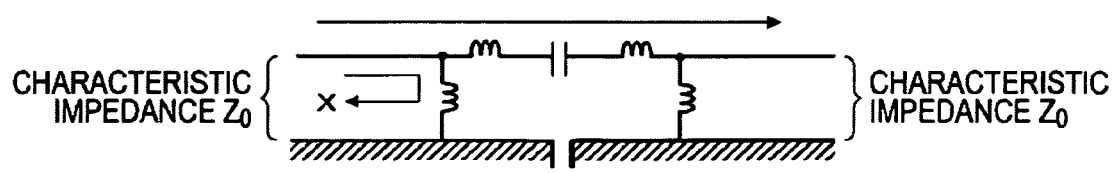
FIG. 21 is a diagram of the arrangement of EFC antennas shown in FIG. 20 facing each other, the entirety of which functions as a band-pass filter.

EFC antennas provided in the transmitter 10 and in the receiver 20 include, as illustrated in FIG. 20, the coupling electrodes 13 and 23 in a plate shape, parallel inductors 12A and 22A, and series inductors 12B and 22B, which are connected to the RF-signal transmission line. In the case where the above-mentioned EFC antennas are arranged facing each other, as illustrated in FIG. 21, the two electrodes operate as a capacitor, and the EFC antennas as a whole operate as a band-pass filter. Therefore, an RF signal can be transmitted efficiently between the two EFC antennas. The RF-signal transmission line mentioned here corresponds to a coaxial cable, a microstrip line, a coplanar line, or the like.

In the contactless communication system illustrated in FIG. 19, the necessary conditions for the EFC antennas to transmit an RF signal, such as a UWB signal, using electric-field coupling are as follows:

(1) the presence of electrodes for establishing electric-field coupling;

(2) the presence of parallel inductors for establishing stronger electric-field coupling; and (3) the setting of the constants of the inductors and the constant of a capacitor including the electrodes such that the impedance matching can be achieved in a frequency band used for communication in the case where the EFC antennas are placed facing each other.

Figure 22:
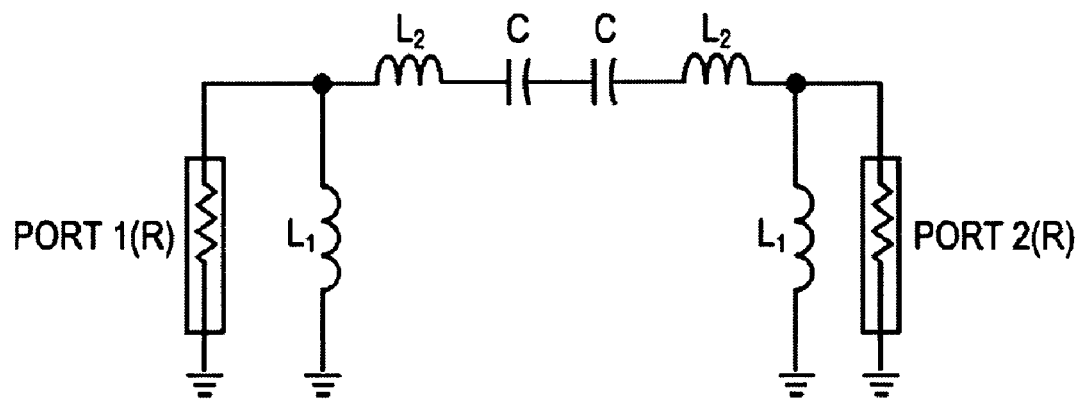
FIG. 22 is an equivalent circuit diagram of a band-pass filter including a pair of EFC antennas.

The passband frequency $f_0$ of a band-pass filter including a pair of EFC antennas having electrodes facing each other, as illustrated in FIG. 21, can be determined on the basis of the inductances of the series inductors and the parallel inductors and the capacitance of the capacitor including the electrodes. FIG. 22 is an equivalent circuit diagram of a band-pass filter including a pair of EFC antennas. Given the characteristic impedance R [Ω], the center frequency $f_0$ [Hz], and the phase difference $\alpha$ [radian] ($\pi < \alpha < 2\pi$) between an input signal and a pass signal, and the capacitance C/2 of the capacitor including the electrodes, the constants of the parallel inductance $L_1$ and the series inductance $L_2$ included in the band-pass filter can be calculated in accordance with the operating frequency $f_0$ using the following equations:

$$L_1 = -\frac{R(1+\cos\alpha)}{2\pi f_0 \sin\alpha}[H] \qquad (1)$$

$$L_2 = \frac{1+\pi f_0 CR\sin\alpha}{4\pi^2 f_0^2 C}[H]$$

Figure 23:
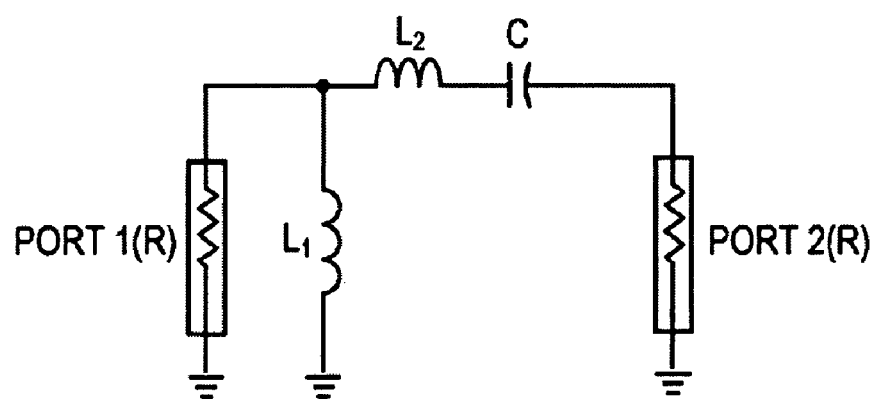
FIG. 23 is an equivalent circuit of the case where the single EFC antenna illustrated in FIG. 20 functions as an impedance conversion circuit.

In the case where a single EFC antenna functions as an impedance conversion circuit, an equivalent circuit thereof is illustrated in FIG. 23. In the circuit diagram illustrated in FIG. 23, the parallel inductance $L_1$ and the series inductance $L_2$ are selected in accordance with the operating frequency $f_0$ so as to satisfy the following equations and expression, thereby implementing an impedance conversion circuit configured to convert the characteristic impedance from $R_1$ to $R_2$:

$$L_1 = \frac{R_1}{2\pi f_0} \sqrt{\frac{R_2}{R_1 + R_2}} \, [H] \qquad (2)$$

$$L_2 = \frac{1}{4\pi^2 f_0^2} \left( \frac{1}{C} - 2\pi f_0 \sqrt{R_2(R_1 - R_2)} \right) [H]$$

$$R_1 > R_2$$

Figure 24:
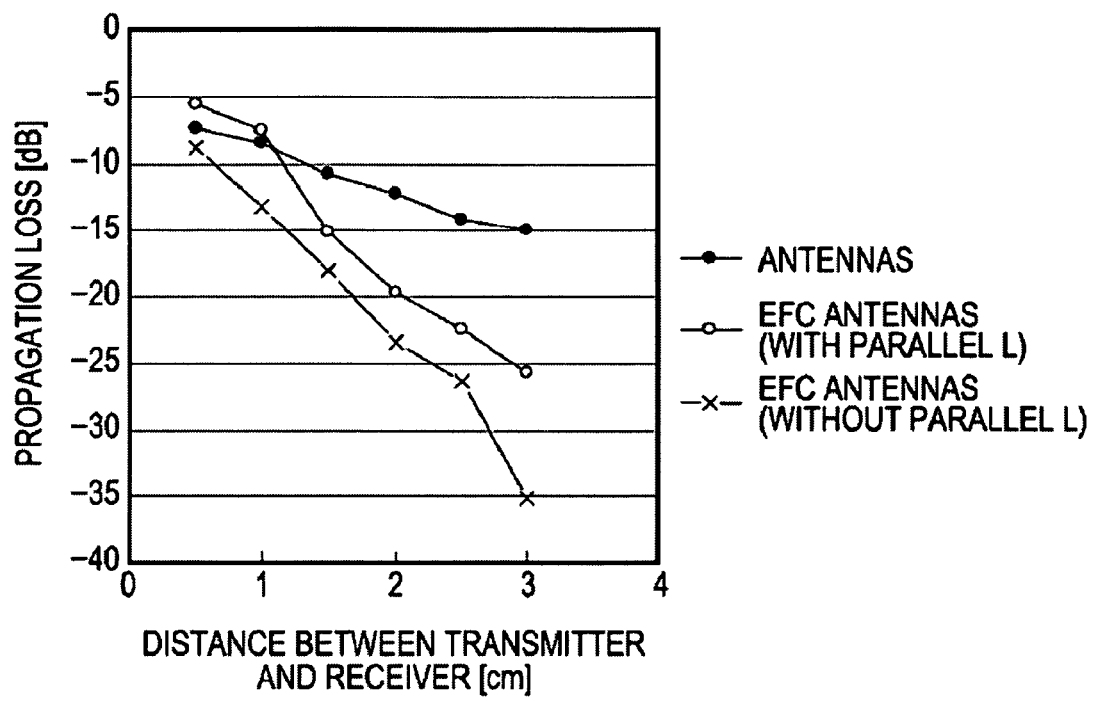
FIG. 24 is a graph of the measurement results of propagation losses obtained by changing the distance between antennas, EFC antennas (with parallel inductors), and EFC antennas (without parallel inductors) which are placed facing each other.

FIG. 24 is a graph of the measurement results of propagation losses obtained by changing the distance between antennas, EFC antennas (with parallel inductors), and EFC antennas (without parallel inductors) which are placed facing each other.

In the case of the EFC antennas (with parallel inductors), the EFC antennas are strongly coupled to each other up to a short distance of approximately 1 cm, and the propagation loss is small. However, the signal is rapidly attenuated as the distance increases, resulting in characteristics that do not interfere with the surrounding neighborhood. In contrast, in the case of antennas, the propagation loss does not become as large as that in the case of the EFC antennas (with parallel inductors) even when the distance increases, and a signal disturbing other wireless systems may possibly be generated. In the case of the EFC antennas without parallel inductors, the propagation efficiency is low, and the propagation loss is large even in the case where a communication partner is nearby.

The coupling electrodes of the EFC antennas are connected to the RF transmission line, such as a coaxial cable, a microstrip line, or a coplanar line. The "EFC antennas" mentioned in this specification solve problems inherent in RF circuits.

As has been described above, in the contactless communication system illustrated in FIG. 19, communication devices that perform the UWB communication use the EFC antennas illustrated in FIG. 20 instead of antennas used in wireless communication devices employing a known radio communication scheme. Therefore, very-short-distance data transmission with features that have not been achieved before can be implemented.

Figure 18A:
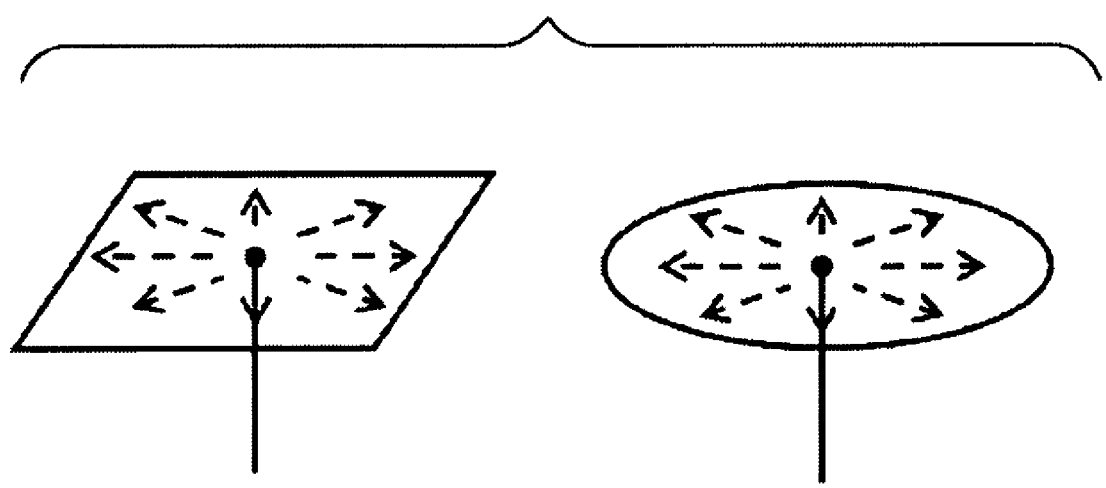
FIG. 18A illustrates the flow of current in an electrode of an EFC antenna in the case where an RF transmission line is connected to the center of the electrode.
Figure 18B:
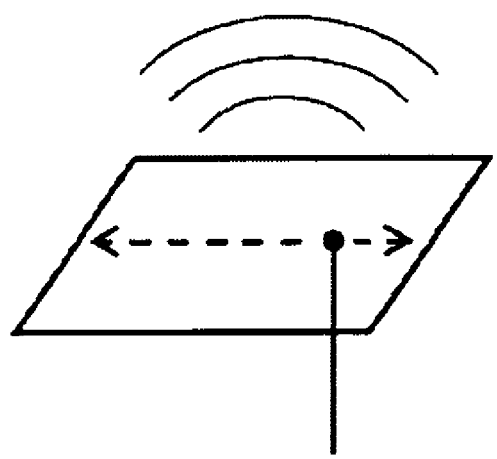
FIG. 18B illustrates the uneven flow of current in an electrode of an EFC antenna and the radiation of unnecessary radio waves in the case where an RF transmission line is connected to a position offset from the center of the electrode.

Assume that a resonating section 12 (or an RF transmission line) including a series inductor or the like is connected to the center of the transmission electrode 13. By connecting the RF transmission line to the center of the electrode 13, current flows evenly in the electrode 13, thereby preventing unnecessary radio waves from emanating in front of the electrode 13 in a substantially perpendicular direction relative to the electrode surface (see FIG. 18A). In contrast, by connecting the resonating section 12 to a position offset from the center of the electrode 13, current flows unevenly in the electrode 13, and the electrode 13 operates as a microstrip antenna and emits unnecessary radio waves (see FIG. 18B).

Figure 25:
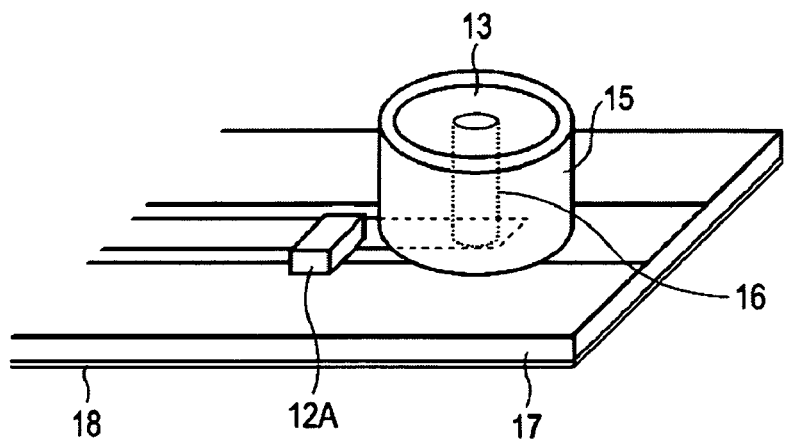
FIG. 25 illustrates an exemplary structure of the actual EFC antenna illustrated in FIG. 20.

FIG. 25 shows an exemplary structure of the actual EFC antenna illustrated in FIG. 20. In the example shown in FIG. 25, the EFC antenna of the transmitter 10 is illustrated. However, the receiver 20 includes a similar EFC antenna. Referring to FIG. 25, the electrode 13 is disposed on the upper surface of a cylindrical dielectric 15 and is electrically connected to a signal line on a printed circuit board 17 via a through hole 16 penetrating through the dielectric 15. The EFC antenna illustrated can be fabricated by, for example, forming a through hole in a cylindrical dielectric of a predetermined height, forming a conductive pattern serving as a coupling electrode on the upper end face of the cylinder, filling the through hole with conductor, and mounting the dielectric on a printed circuit board by reflow soldering or the like.

The height from a circuit mounting surface of the printed circuit board 17 to the electrode 13, that is, the length of the through hole 16, is adjusted appropriately in accordance with the operating wavelength to allow the through hole 16 to have an inductance, which can therefore replace the series inductor 12B. The signal line is connected to ground 18 via the parallel inductor 12A having a chip shape. Although not shown in the drawing, the parallel inductance may be substituted for by a wiring pattern on the printed circuit board, instead of a chip. This type of inductance includes a distributed-constant circuit and may also be referred to as a "stub" in the following description.

The dielectric 15 and the through hole 16 play the role of avoiding the coupling between the electrode 13 and the ground 18 and the role of forming the series inductor 12B. Having a sufficient height from the circuit mounting surface of the printed circuit board 17 to the electrode 13 to obtain an inductance equivalent to the series inductor 12B, the electric-field coupling between the ground 18 and the electrode 13 is avoided, and the function as the EFC antenna (that is, the electric-field coupling to the EFC antenna at the receiver side) is ensured. Note that, when the height of the dielectric 15 is large, that is, the distance from the circuit mounting surface of the printed circuit board 17 to the electrode 13 is so long relative to the operating wavelength that the distance is difficult to be ignored, the series inductor 12B, i.e., the resonating section 12, operates as an antenna and adversely emits radio waves. In this case, the attenuation of radio waves emitted by the resonating section 12 of the EFC antenna behaving as an antenna relative to the distance is smaller than that of an electrostatic field or an induced electric field. It is thus difficult to suppress these radio waves to very weak radio waves where the strength of an electric field at a distance of 3 m from a wireless facility is less than or equal to a predetermined level. Therefore, the height of the dielectric 15 is determined on the basis of the following conditions: the coupling to the ground 18 is avoided while the characteristics as the EFC antenna are fully achieved; the series inductor 12B necessary for operating as a resonant circuit is formed; and the size of the resonating section including the series inductor 12B is such that the operation as an antenna is not so strong.

In general, metal hinders efficient radiation of radio waves emitted from an antenna. For this reason, it is not allowed to place metal such as ground near a radiant element of an antenna. In contrast, in the communication system according to the embodiment, the characteristics of the EFC antenna are not deteriorated even in the case where metal is placed facing the backside of the electrode 13. The EFC antenna can be made more compact than a known antenna by appropriately selecting the constants of the series inductor 12B and the parallel inductor 12A. Unlike an antenna, an electrostatic field has no polarization. A predetermined level of communication quality can thus be achieved even with a different orientation.

Figure 5:
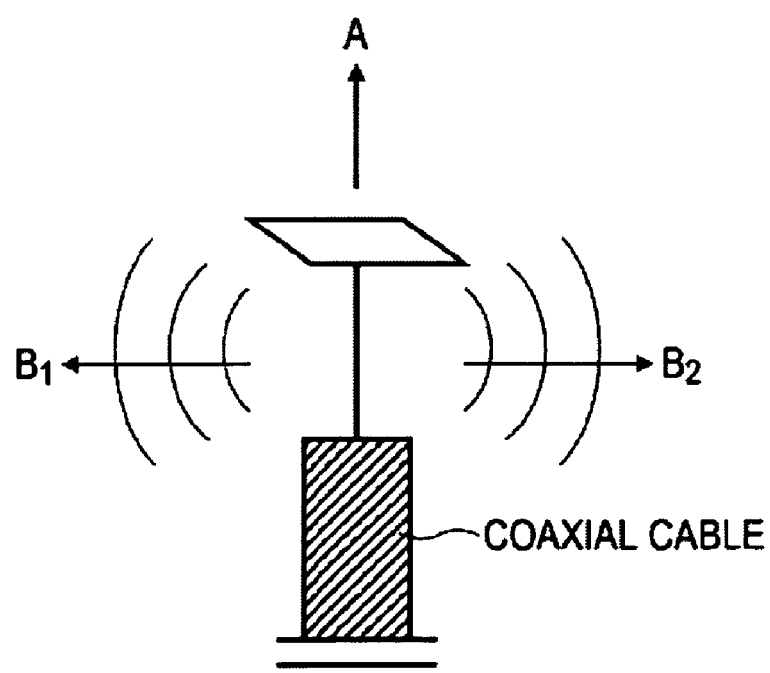
FIG. 5 is a diagram of an exemplary structure of a capacitance-loaded antenna.

In the field of radio communication, "capacitance-loaded" antennas in which metal is attached to the tip of an antenna element, as illustrated in FIG. 5, thereby inducing a capacitance and reducing the height of the antenna, are widely known. At a glance, this type of antenna has a structure similar to that of the EFC antenna illustrated in FIG. 20. A description will be given of the differences between an EFC antenna used in a transmitter/receiver of the embodiment and a capacitance-loaded antenna.

A capacitance-loaded antenna illustrated in FIG. 5 emits radio waves in directions $B_1$ and $B_2$ around a radiant element of the antenna. However, the antenna emits no radio waves in direction A, which serves as a null point. Electric fields generated around the antenna are examined in detail. Specifically, a radiated electric field attenuated in inverse proportion to the distance from the antenna, an induced electric field attenuated in inverse proportion to the square of the distance from the antenna, and an electrostatic field attenuated in inverse proportion to the cube of the distance from the antenna are generated. Because the induced electric field and the electrostatic field are attenuated relative to the distance more rapidly than the radiated electric field, only the radiated electric field is discussed in general wireless systems, and the induced electric field and the electrostatic field are often neglected. Even in the case of the capacitance-loaded antenna illustrated in FIG. 5, an induced electric field and an electrostatic field are generated in direction A but are rapidly attenuated in air. Therefore, such an induced electric field and an electrostatic field are not actively employed in radio communication.

Figure 16:
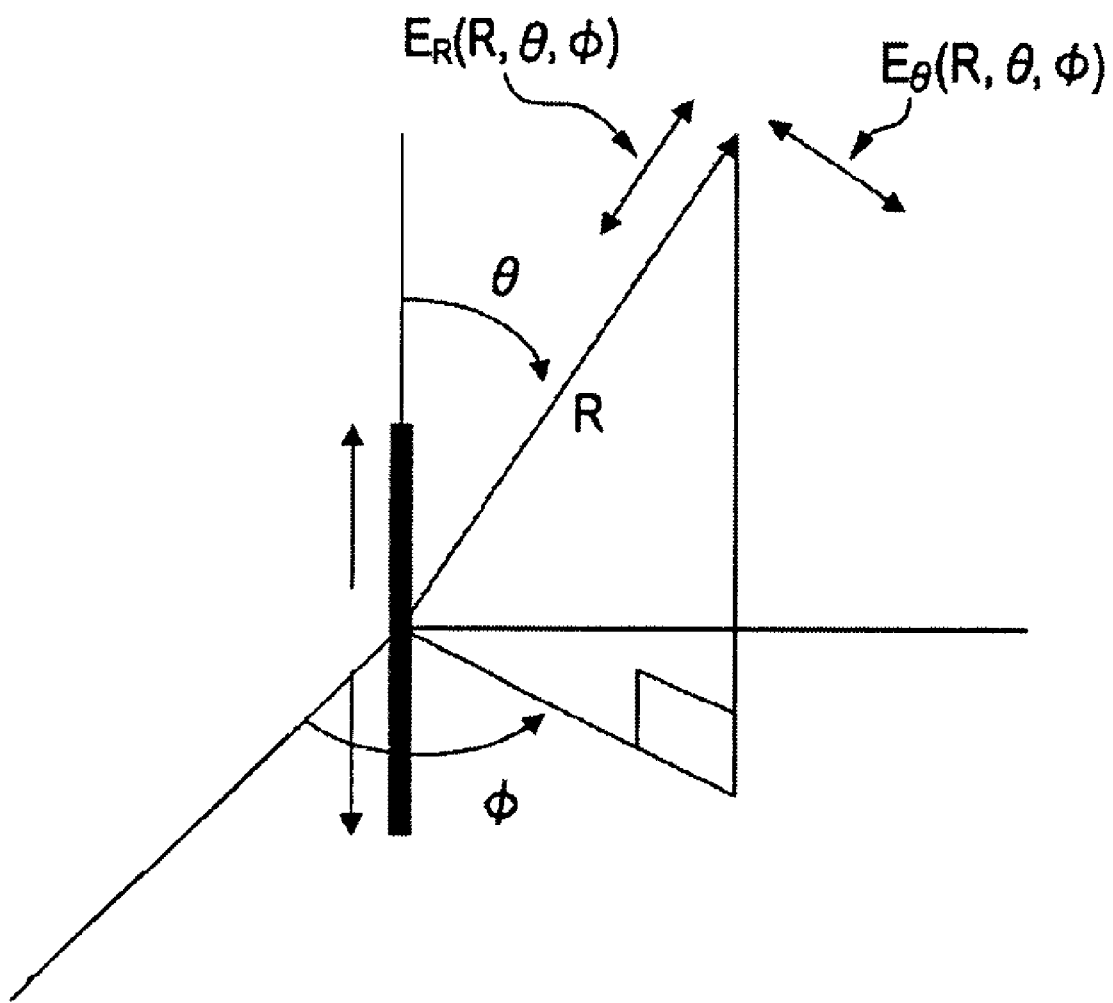
FIG. 16 illustrates an electric field component (longitudinal wave component) $E_R$ causing vibration parallel to the direction of propagation.
Figure 26:
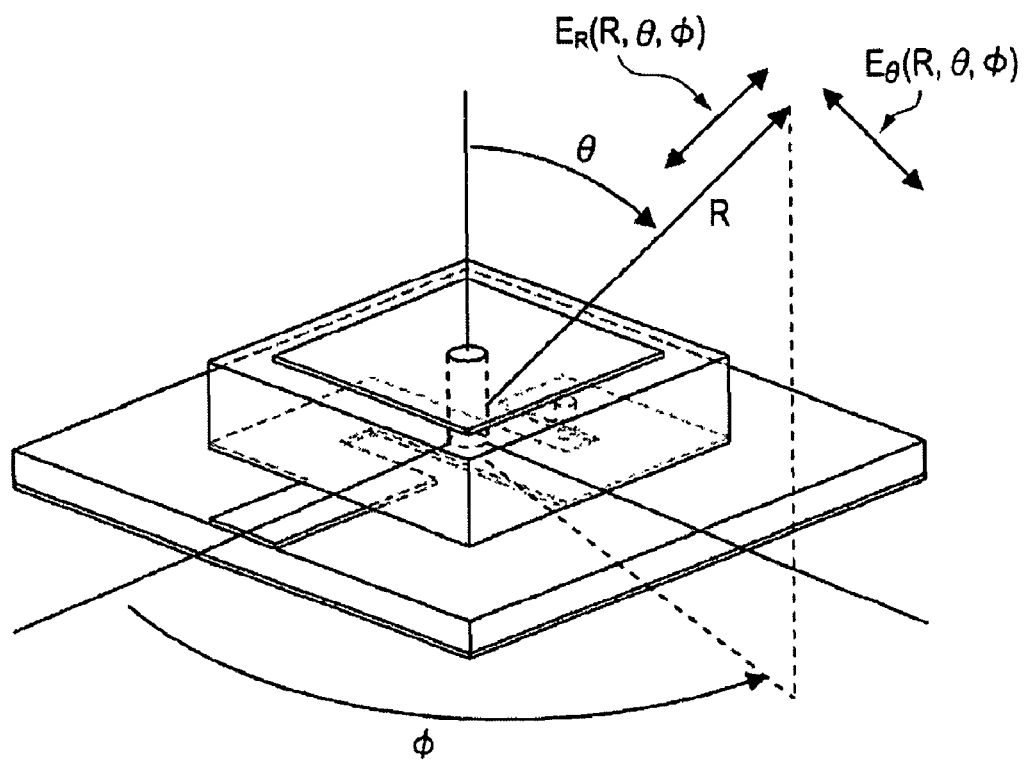
FIG. 26 illustrates the mapping of an electromagnetic field induced by an infinitesimal dipole on a coupling electrode.

An electromagnetic field generated by a coupling electrode of a transmitter will be examined. FIG. 16 illustrates an electromagnetic field induced by an infinitesimal dipole. FIG. 26 illustrates the mapping of this electromagnetic field on the coupling electrode. As shown in the diagrams, the electromagnetic field is largely classified into an electric field component (transverse wave component) $E_\theta$ causing vibration in a direction perpendicular to the direction of propagation and an electric field component (longitudinal wave component) $E_R$ causing vibration parallel to the direction of propagation. A magnetic field $H_\phi$ is also generated around the infinitesimal dipole. The following equations represent an electromagnetic field induced by an infinitesimal dipole. Any current distribution can be regarded as a continuous assembly of such infinitesimal dipoles. Therefore, electromagnetic fields induced by these infinitesimal dipoles have similar characteristics (for example, see Yasuto Mushiake, "Antenna Denpa Denpan (Antenna/Radio-Wave Propagation)", published by Corona Publishing Co., Ltd., 1985, pp. 16-18).

$$E_\theta = \frac{pe^{-jkR}}{4\pi\varepsilon}\left(\frac{1}{R^3} + \frac{jk}{R^2} - \frac{k^2}{R}\right)\sin\theta \qquad (3)$$

$$E_R = \frac{pe^{-jkR}}{2\pi\varepsilon}\left(\frac{1}{R^3} + \frac{jk}{R^2}\right)\cos\theta$$

$$H_\phi = \frac{j\omega pe^{-jkR}}{4\pi}\left(\frac{1}{R^2} + \frac{jk}{R}\right)\sin\theta$$

As is clear from the above equations, the electric-field transverse wave component includes a component in inverse proportion to the distance (radiated electric field), a component in inverse proportion to the square of the distance (induced electric field), and a component in inverse proportion to the cube of the distance (electrostatic field). The electric-field longitudinal wave component includes a component in inverse proportion to the square of the distance (induced electric field) and a component in inverse proportion to the cube of the distance (electrostatic field), but does not include a component of the radiated electromagnetic field. The electric field $E_R$ reaches its maximum in directions where $|\cos\theta|=1$, that is, in directions indicated by arrows in FIG. 16.

In radio communication widely employed in wireless communication, a radio wave emitted from an antenna is a transverse wave $E_\theta$ causing vibration in a direction perpendicular to its direction of travel. A radio wave perpendicular to the direction of polarization is not communicated. In contrast, an electromagnetic wave emanating from a coupling electrode by employing a communication scheme using an electrostatic field or an induced electric field includes, besides a transverse wave $E_\theta$, a longitudinal wave $E_R$ causing vibration along its direction of travel. The longitudinal wave $E_R$ is also referred to as a "surface wave". A surface wave can also propagate through the interior of a medium, such as a conductor, a dielectric, or a magnetic body (which will be described later).

In a contactless communication system, a signal can be transmitted through the intermediary of any of a radiated electric field, an electrostatic field, and an induced electric field. However, a radiated electric field, which is inversely proportional to the distance, may interfere with other systems located relatively far away. It is thus preferable to suppress the radiated electric field component, that is, to perform contactless communication using the longitudinal wave $E_R$ containing no radiated electric field component while suppressing the transverse wave $E_\theta$ containing the radiated electric field component.

From the above-mentioned viewpoint, the EFC antennas according to the embodiment are devised in the following manner. That is, the above-mentioned three equations representing the electromagnetic field show that, in the case where $\theta=0°$ holds true, $E_\theta=0$ holds true, and the $E_R$ component reaches its maximum. More specifically, $E_\theta$ reaches its maximum when it is perpendicular to the direction of current flow, and $E_R$ reaches its maximum when it is parallel to the direction of current flow. In order to maximize $E_R$ in front of the electrode, which is perpendicular to the electrode surface, it is preferable to increase current components perpendicular to the electrode. In contrast, in the case where the feeding point is offset from the center of the electrode, current components parallel to the electrode increase due to this offset. In accordance with the current components, the $E_\theta$ component in front of the electrode increases. Therefore, each of the EFC antennas according to the embodiment provides the feeding point substantially at the center of the electrode (described above), as illustrated in FIG. 18A, such that the $E_R$ component can be maximized.

In known antennas, besides a radiated electric field, an electrostatic field and an induced electric field are also generated. The electric-field coupling occurs in the case where a transmission antenna and a reception antenna are placed near each other. However, since most of the energy is emitted as a radiated electric field, such known antennas are insufficient to perform contactless communication. In contrast, the EFC antennas illustrated in FIG. 20 include the coupling electrodes and the resonating sections in order to improve the transmission efficiency by generating a stronger electric field $E_R$ at a predetermined frequency.

In the case where the EFC antenna of the transmitter illustrated in FIG. 20 is used alone, a longitudinal-wave electric field component $E_R$ is generated on the surface of the coupling electrode. Since a transverse-wave component $E_\theta$ containing a radiated electric field is smaller than $E_R$, only negligible radio waves are emitted. That is, waves interfering with other neighboring systems are not generated. Most of the signals input to the EFC antenna are reflected from the electrode back to an input end.

In contrast, in the case where a pair of EFC antennas is used, that is, in the case where EFC antennas of a transmitter and a receiver are placed at a short distance, coupling electrodes are coupled to each other mainly by a quasi-electrostatic field component and operate as a capacitor. As a result, the EFC antennas as a whole operate as a band-pass filter, thus achieving impedance matching. At passband frequencies, signals and power are largely transmitted to a communication partner and are negligibly reflected back to the input end. The "short distance" mentioned here is defined by wavelength λ, that is, corresponds to the distance between the coupling electrodes d being d<<λ/2π. For example, in the case where the operating frequency $f_0$ is 4 GHz, the "short distance" between the electrodes is a distance of 10 mm or less.

In the case where the EFC antennas of the transmitter and the receiver are placed at a medium distance, an electrostatic field is attenuated and a longitudinal-wave electric field $E_R$ mainly containing an induced electric field is generated in the vicinity of the coupling electrode of the transmitter. The longitudinal-wave electric field $E_R$ is received by the coupling electrode of the receiver, whereby a signal is transmitted. Note that, compared with the case where the EFC antennas are placed at a short distance, it is more likely that a signal input to the EFC antenna of the transmitter will be reflected from the electrode back to the input end. The "medium distance" mentioned here is defined by the wavelength λ, that is, corresponds to the distance between the coupling electrodes d being approximately one to a few times λ/2π. In the case where the operating frequency $f_0$ is 4 GHz, the "medium distance" between the electrodes is a distance from 10 mm to 40 mm.

In a communication scheme using an electrostatic field or an induced electric field, the electric field strength is rapidly attenuated in inverse proportion to the cube or the square of the distance. Therefore, the communication range is limited to a very short distance. In the case where an RF signal is used as in the UWB communication or the like, a large propagation loss is incurred due to the short wavelength. It is therefore necessary to attach the electrodes (EFC antennas) of the transmitter and the receiver to each other as much as possible, meaning that communication over a long distance is difficult. In order to place the electrodes sufficiently close to each other, the electrodes are necessary to be aligned in a very fine manner. The positions of the electrodes are necessary to be maintained during data communication, which is inconvenient for a user.

In contrast, the communication system according to the embodiment of the present invention includes a dielectric or magnetic surface-wave transmission line disposed between the coupling electrode of the transmitter and the coupling electrode of the receiver, allowing a surface wave of an electromagnetic wave emanating from the coupling electrode of the transmitter to propagate efficiently in the interior and on the surface of the surface-wave transmission line. Even in the case where the coupling electrodes of the transmitter and the receiver are placed at a relatively long distance, a surface wave emanating due to the electric-field coupling is transmitted with a low propagation loss, thereby performing data communication. It thus becomes unnecessary to directly attach the coupling electrodes of the transmitter and the receiver to each other.

Of transmission waves using electromagnetic fields, a wave whose phase velocity v is slower than the velocity of light c is referred to as a "slow wave", and a wave whose phase velocity v is faster than the velocity of light c is referred to as a "fast wave". A surface wave corresponds to the former slow wave. In the case of an infinitely long transmission line in a slow-wave structure, energy is transmitted through the transmission line in a concentrated manner and is not emitted to the outside (for example, see Tasuku Teshirogi and Tsukasa Yoneyama, "Shin Miri-ha Gijutsu (New Millimeter Wave Technology)", published by Ohmsha, Ltd., 1999, p. 119). The "surface wave" mentioned here corresponds to the longitudinal wave $E_R$, which is a component causing vibration parallel to the direction of propagation, of the electric fields generated from the coupling electrodes (described above).

The propagation mechanism of an electromagnetic wave along the surface of a conductor, a dielectric, or a magnetic body is known as, for example, the "Goubau line" or "G line" (for example, see U.S. Pat. Nos. 2,685,068 and 2,921,277).

For example, Japanese Unexamined Patent Application Publication No. 2003-115707 discloses a surface-wave transmission line using a dielectric made of a thermoplastic polymer as a medium. Japanese Unexamined Patent Application Publication No. 7-175987 makes a proposal for a surface-wave transmission line that can suppress, to a certain degree, a distribution range of electromagnetic fields by twisting together dielectrics or dielectric fibers with a less RF loss in a predetermined cyclic configuration. The propagation mechanism of an electromagnetic wave in a surface-wave transmission line is described in detail in, for example, Masamitsu Nakajima, "Maikuro-ha Kougaku (Microwave Technology)", published by Morikita Publishing Co., Ltd., 1995, pp. 182-190.

Electromagnetic surface waves propagating in a ferrite rod which is magnetized in the axial direction have been extensively researched. Three types of surface-wave modes are already known: "dynamic", "surface" (surface mode), and "volume" (volume mode). The dynamic mode exists at frequencies where the ferrite rod can be simply regarded as a dielectric, and a forward wave propagates in the dynamic mode. In contrast, the surface mode and the volume mode are modes where electric power is concentrated near the surface or in the center of the ferrite rod, and a backward wave mainly propagates in these modes. Among these modes, the surface mode is applied to a resonator, and the volume mode is applied to a delay line and a Faraday rotator (see Toshimi Meiri, "Heikouna Nihonno Ferrite-bou wo Denpan-suru Hyoumen-ha no Kenkyu (Research on surface waves propagating in two parallel ferrite rods), Doctoral Dissertation, Mar. 28, 1981)".

Figure 3:
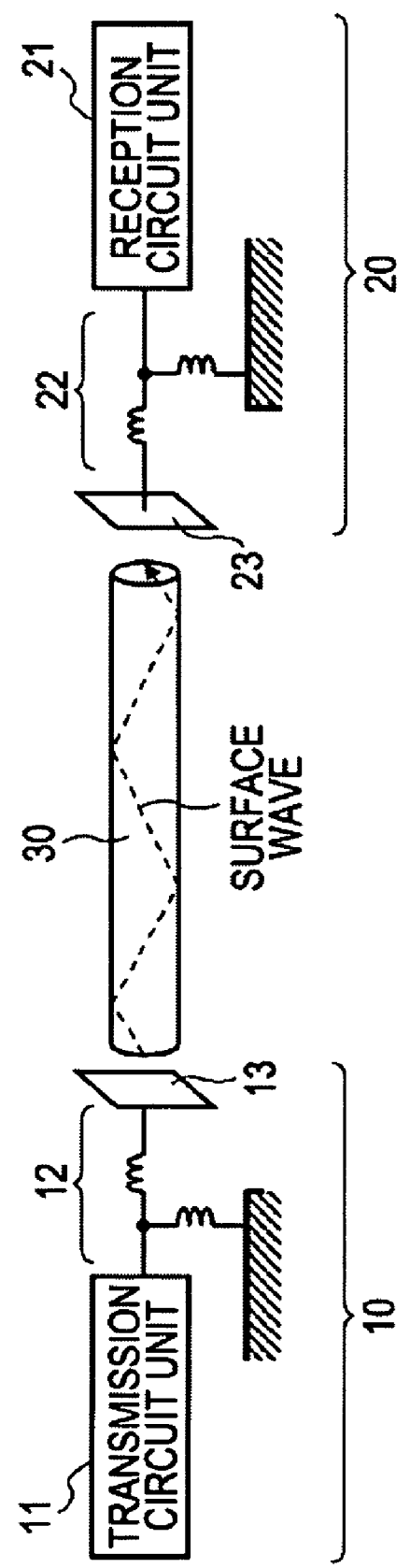
FIG. 3 is a diagram of an exemplary configuration of a communication system according to an embodiment of the present invention.

FIG. 3 shows an exemplary configuration of a contactless communication system in which a surface-wave transmission line is interposed between RF coupling electrodes of a transmitter and a receiver. The illustrated communication system includes the transmitter 10 configured to perform data transmission, the receiver 20 configured to perform data reception, and a surface-wave transmission line 30 configured to transmit a surface wave emanating from the transmission electrode 13 of the transmitter 10 with a low propagation loss. The surface-wave transmission line 30 is made of a dielectric or magnetic material and is disposed along the direction of travel of the surface wave emanating from the transmission electrode 13.

In response to a transmission request issued from an upper application, the transmission circuit unit 11 of the transmitter 10 generates an RF transmission signal, such as a UWB signal, on the basis of transmission data. The signal output from the transmission circuit unit 11 resonates at the resonating section 12, and the signal is emitted from the transmission electrode 13 as a surface wave in front of the electrode.

The surface wave emitted from the transmission electrode 13 propagates efficiently through the intermediary of the surface-wave transmission line 30, which is then input from the reception electrode 23 of the receiver 20 to the reception circuit unit 21 via a resonating section 22. The reception circuit unit 21 demodulates and decodes the RF signal received to reproduce data and transfers the reproduced data to the upper application.

The surface wave emitted from the transmission electrode 13 is incident on one end face of the surface-wave transmission line 30. The surface wave inside the surface-wave transmission line 30 is repeatedly reflected every time the surface wave reaches the interface between the inside and the outside of the surface-wave transmission line 30 and propagates to the reception side without loss (which will be described later). Through the intermediary of the surface-wave transmission line 30, a signal can propagate efficiently from the transmission electrode 13 to the reception electrode 23. In order to increase the incident angle of a surface wave emanating from the transmission electrode 13 and to reduce the amount of the surface wave emitted to the outside as a transmitted wave, it is preferable to place the end face of the dielectric or magnetic surface-wave transmission line 30 in front of the transmission electrode 13 such that the end face can be substantially perpendicular to the electrode surface.

Figure 4:
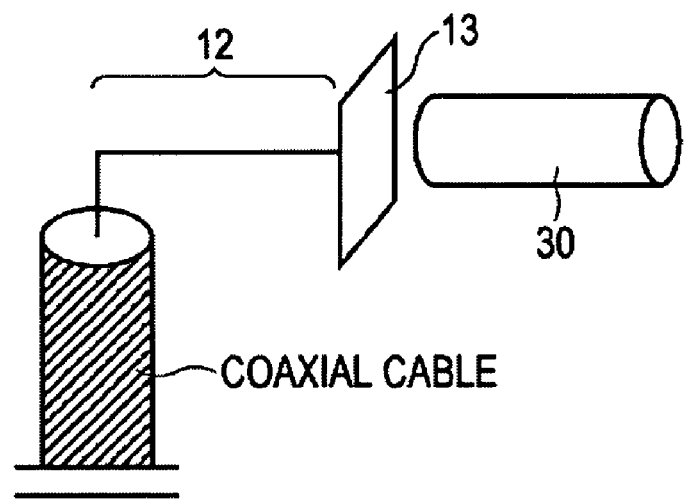
FIG. 4 is a diagram of an exemplary structure of a surface-wave emitting portion of a transmitter 10.

FIG. 4 shows an exemplary structure of a surface-wave emitting portion (EFC antenna) of the transmitter 10. Note that the structure of a surface-wave receiving portion of the receiver 20 is similar to the structure illustrated in FIG. 4.

As illustrated in FIG. 4, a line-conductor resonating section with a predetermined length and an electrode are connected to the tip of an RF signal line including a coaxial cable. The resonating section 12 and the transmission electrode 13 as a whole are designed to have one-fourth of the wavelength of a predetermined frequency, thereby causing resonation at the predetermined frequency and generating a surface wave at that frequency. In general, the generated surface wave is attenuated rapidly in air as the distance increases. By connecting the tip of the resonating section 12 to the center of the transmission electrode 13 and by disposing the dielectric or magnetic surface-wave transmission line 30 in front of the electrode 13 in a direction substantially perpendicular to the emitting side of the electrode 13, a surface wave emitted from the transmission electrode 13 can be captured by the dielectric or magnetic surface-wave transmission line 30, thereby realizing a surface-wave transmitter (or an EFC antenna).

The dielectric or magnetic surface-wave transmission line 30 is disposed, at a position substantially perpendicular to the electrode surface, in front of the transmission electrode 13 having a strong induced electric field and a strong electrostatic field. In the case where an induced electromagnetic field and an electrostatic field generated near the electrode 13 are captured at one end face of the surface-wave transmission line 30, the captured electric fields propagate inside the transmission line 30 and are input to the reception electrode 23 of the receiver 20. That is, an electromagnetic field emitted from the electrode 13 of the transmitter 10 is transmitted as a surface wave in the surface-wave transmission line 30, thus implementing data communication using a surface wave.

Figure 6:
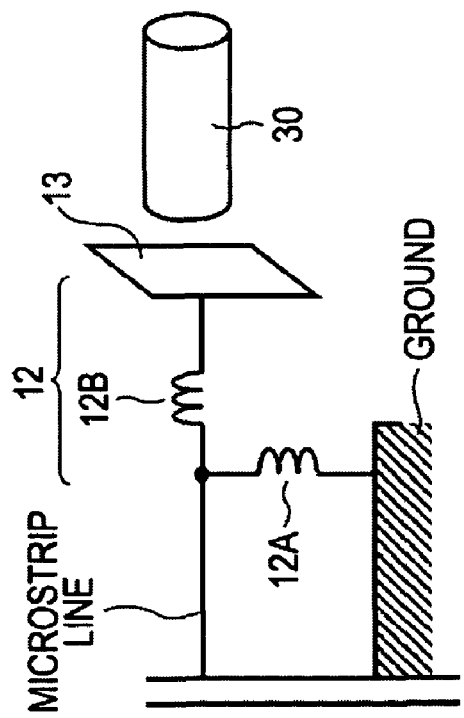
FIG. 6 is a diagram of another exemplary structure of the surface-wave emitting portion of the transmitter 10.

FIG. 6 shows another exemplary structure of the surface-wave emitting portion of the transmitter 10. Note that the structure of the surface-wave receiving portion of the receiver 20 is similar to the structure illustrated in FIG. 6.

In each of the surface-wave emitting and receiving portions, the resonating section 12 including a lumped-constant circuit having, instead of a line conductor, coils and a capacitor is disposed. In the example illustrated in FIG. 6, the resonating section 12 includes the parallel inductor 12A, which is connected between a signal line of an RF transmission line from the transmission circuit unit 11 and ground, and the series inductor 12B, which is connected between the signal line and the electrode 13. A strong electric field is generated in front of the electrode 13, whereby a surface wave can be efficiently generated.

In the transmitter and the receiver, a pair of EFC antennas such as those illustrated in FIG. 6 is disposed facing each other with a surface-wave transmission line interposed therebetween. Two electrodes operate as one capacitor, and the EFC antennas as a whole operate as a band-pass filter. The impedance in the coupling portion can be designed to be continuous by adjusting the constant of the series inductor 12B, the constant of the parallel inductor 12A, and the constant of the capacitor including the electrodes 13 and 23 (described above).

A surface wave entering a dielectric surface-wave transmission line is repeatedly reflected every time the surface wave reaches the interface with the outside and travels in the direction of propagation (that is, toward the receiver side). FIG. 1 illustrates the propagation of a surface wave in a dielectric surface-wave transmission line. Note that the dielectric constant $\in$ of the dielectric is greater than the dielectric constant $\in_0$ of the air surrounding the surface-wave transmission line.

In the case where an electromagnetic wave (surface wave) is incident on the interface between two media having different dielectric constants, refraction occurs as in the case of optics. In the case where the incident angle $\theta_i$ becomes equal to the critical angle $\theta_c$ expressed by the following equation, the refraction angle $\theta_t$ becomes equal to $\pi/2$, and the wave transmitted through the dielectric travels parallel to the interface. In the case where the incident angle $\theta_i$ becomes greater than the critical angle $\theta_c$, total reflection occurs at the interface. Therefore, in the case where an electromagnetic wave enters the interior of a dielectric plate at an appropriate angle, the electromagnetic wave (surface wave) efficiently propagates without loss while being repeatedly reflected at the interface between the two different media.

$$\theta_c = \sin^{-1}\sqrt{\in_0/\in} \quad (4)$$

Figure 2:
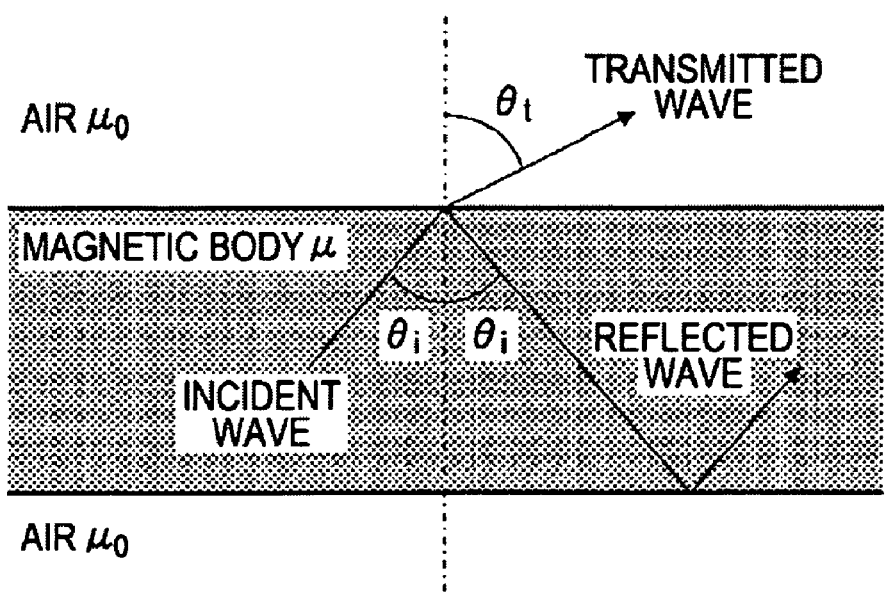
FIG. 2 illustrates the propagation of a surface wave in a magnetic surface-wave transmission line.

FIG. 2 illustrates the propagation of a surface wave in a magnetic surface-wave transmission line. Note that the magnetic permeability $\mu$ of the magnetic body is greater than the magnetic permeability $\mu_0$ of the air surrounding the surface-wave transmission line. In the case where an electromagnetic wave (surface wave) is incident on the interface between two media having different magnetic permeabilities, refraction occurs as in the case of optics. That is, in the case where the incident angle $\theta_i$ becomes equal to the critical angle $\theta_c$ expressed by the following equation, the refraction angle $\theta_t$ becomes equal to $\pi/2$, and the transmitted wave travels parallel to the interface. In the case where the incident angle $\theta_i$ becomes greater than the critical angle $\theta_c$, total reflection occurs at the interface. Therefore, in the case where an electromagnetic wave enters the interior of a magnetic plate at an appropriate angle, the electromagnetic wave (surface wave) efficiently propagates without loss while being repeatedly reflected at the interface between the two different media, as in the case illustrated in FIG. 1.

$$\theta_c = \sin^{-1}\sqrt{\mu_0/\mu} \quad (5)$$

The inventor of the present invention performed a simulation using a finite element method to obtain the distribution of electromagnetic fields generated around a dielectric (or magnetic) surface-wave transmission line interposed between two EFC antennas 1 and 2 facing each other to transmit an RF signal through the surface-wave transmission line. The simulation assumed that the surface-wave transmission line was a dielectric with a relative dielectric constant of 10, a relative magnetic permeability of 10, an electric conductivity of 0 [Siemens/m], a cross-sectional area of 6 mm×6 mm, and a length of 49.6 mm. The distance between each of two end faces of the surface-wave transmission line and a corresponding coupling electrode was set to 50 mm, and the operating frequency was set to 4.5 GHz. Each EFC antenna included a coupling electrode whose area was 11 mm×11 mm and height was 3 mm, which was disposed on a ground board with an area of 20 mm×42 mm, a thickness of 0.8 mm, and a dielectric constant of 3.4. Each resonating section included a stub (described above) with a length of 20 mm and a width of 3 mm. The longitudinal direction of the surface-wave transmission line, that is, the direction in which a signal is transmitted, was regarded as the z-axis, and a plane parallel to each coupling electrode was regarded as the xy plane.

Figure 27:
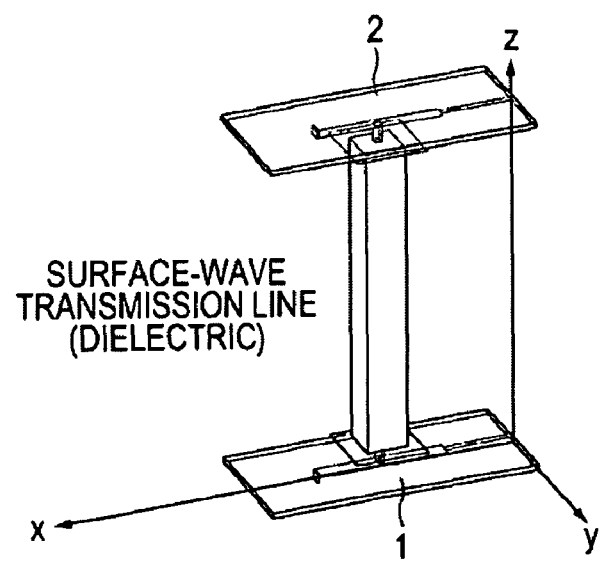
FIG. 27 illustrates the transmission of an RF signal in the case where a dielectric surface-wave transmission line is interposed between two EFC antennas 1 and 2, which face each other.

FIGS. 28A to 28F each illustrate a change in the distribution of electric fields in the zx plane for a half cycle at intervals of one-twelfth of a cycle in the case where an RF signal is transmitted through the intermediary of the surface-wave transmission line as in the structure illustrated in FIG. 27. It is clear from the diagrams that a surface wave with amplitude in a direction perpendicular to the surface of the dielectric surface-wave transmission line propagates from the EFC antenna 1 to the EFC antenna 2.

Figure 28A:
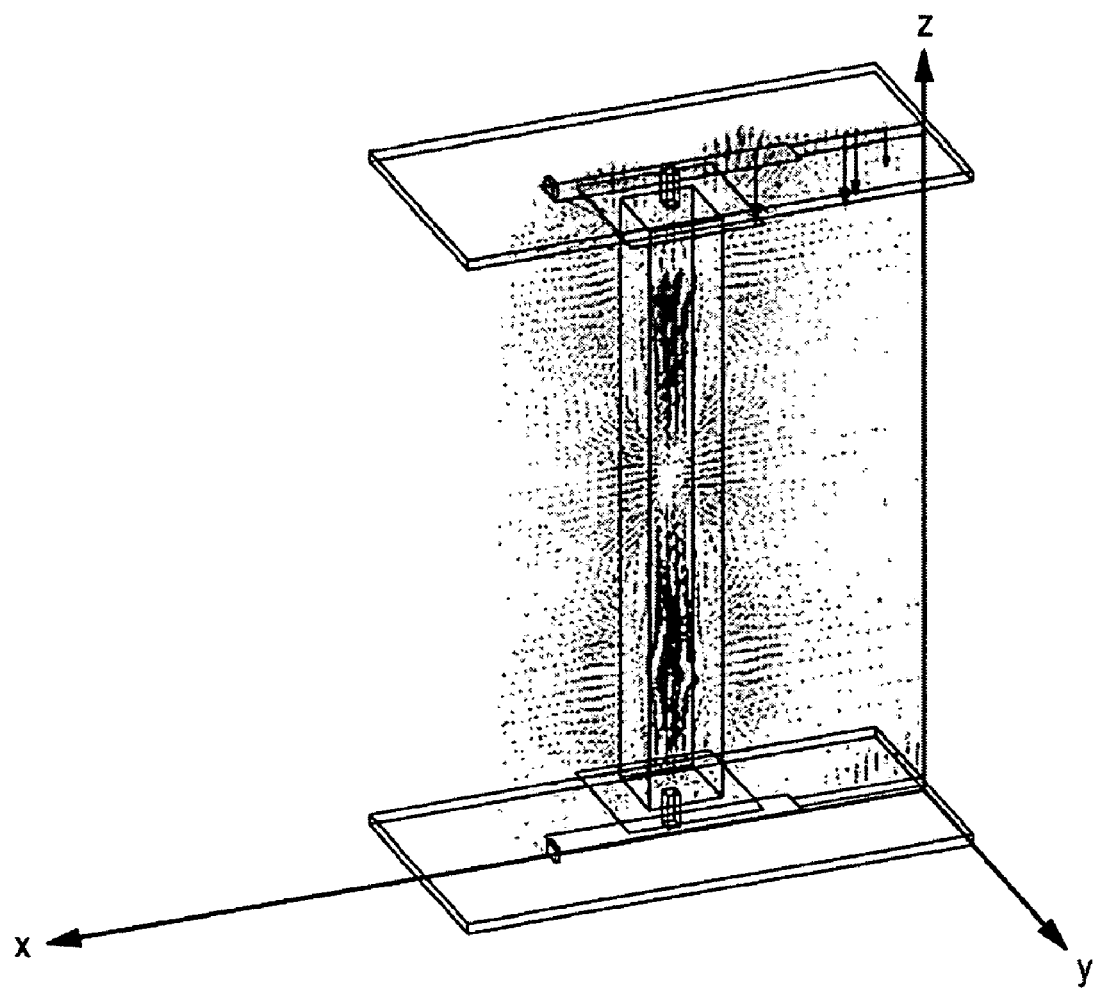
FIG. 28A illustrates a change in the distribution of electric fields in the zx plane for a half cycle at intervals of one-twelfth of a cycle in the case where an RF signal is transmitted through the intermediary of the surface-wave transmission line as in the structure illustrated in FIG. 27.
Figure 28B:
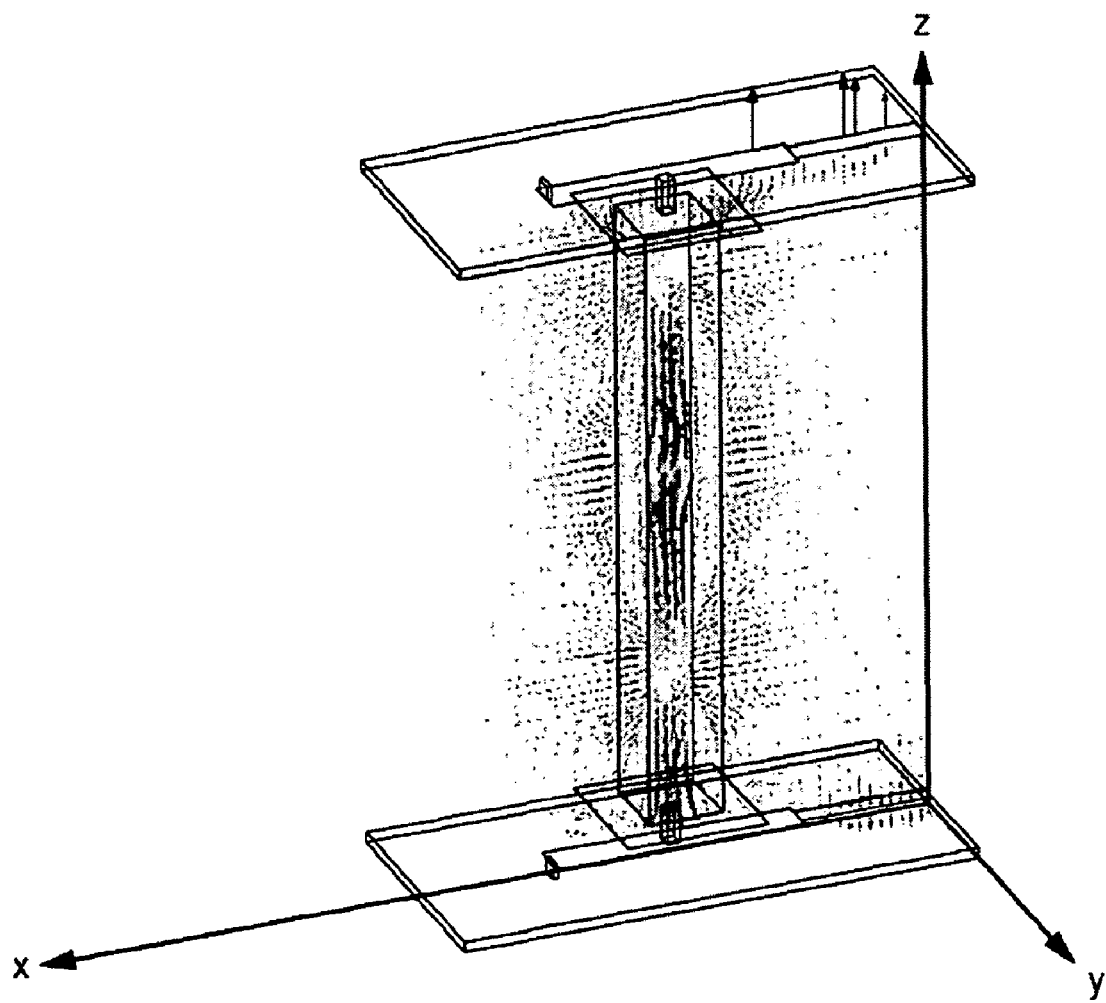
FIG. 28B illustrates a change in the distribution of electric fields in the zx plane for a half cycle at intervals of one-twelfth of a cycle in the case where an RF signal is transmitted through the intermediary of the surface-wave transmission line as in the structure illustrated in FIG. 27.
Figure 28C:
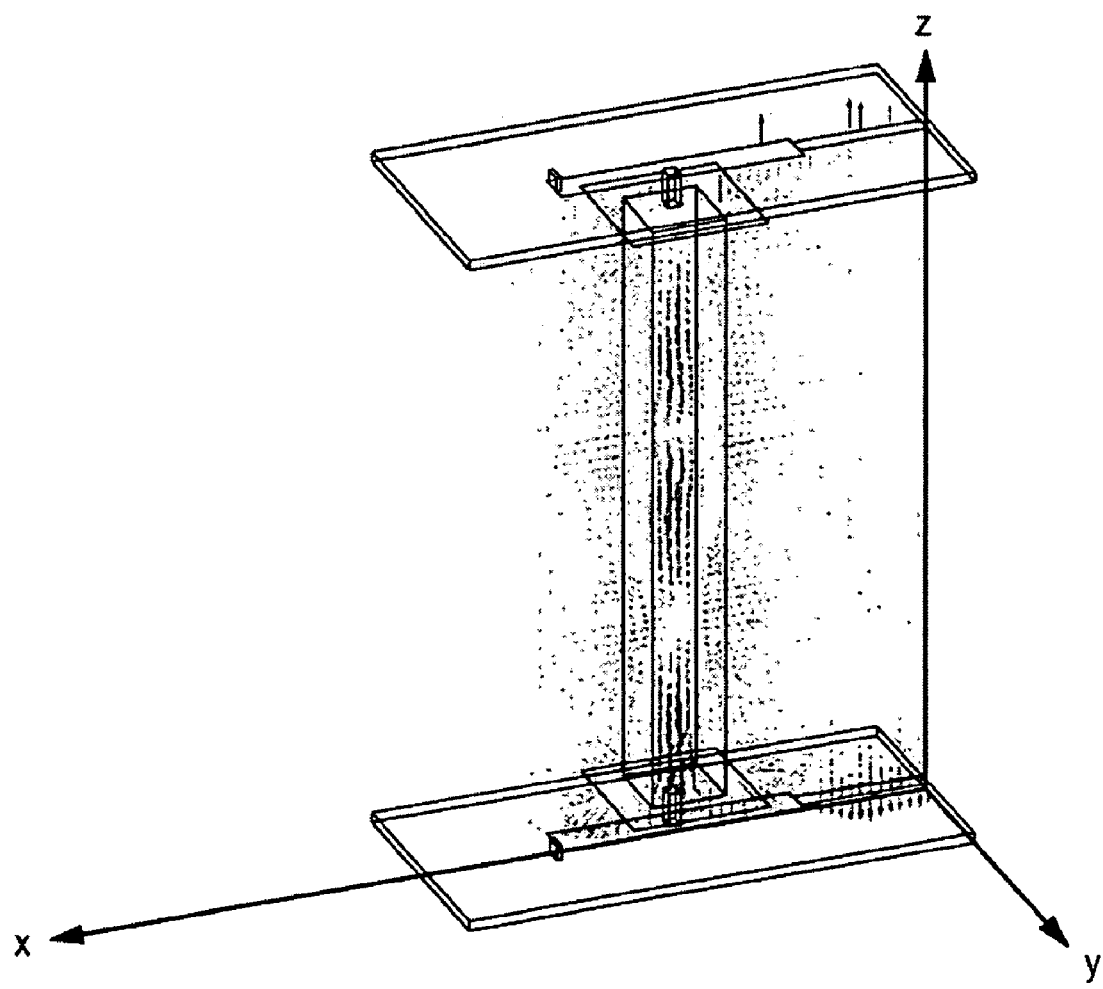
FIG. 28C illustrates a change in the distribution of electric fields in the zx plane for a half cycle at intervals of one-twelfth of a cycle in the case where an RF signal is transmitted through the intermediary of the surface-wave transmission line as in the structure illustrated in FIG. 27.
Figure 28D:
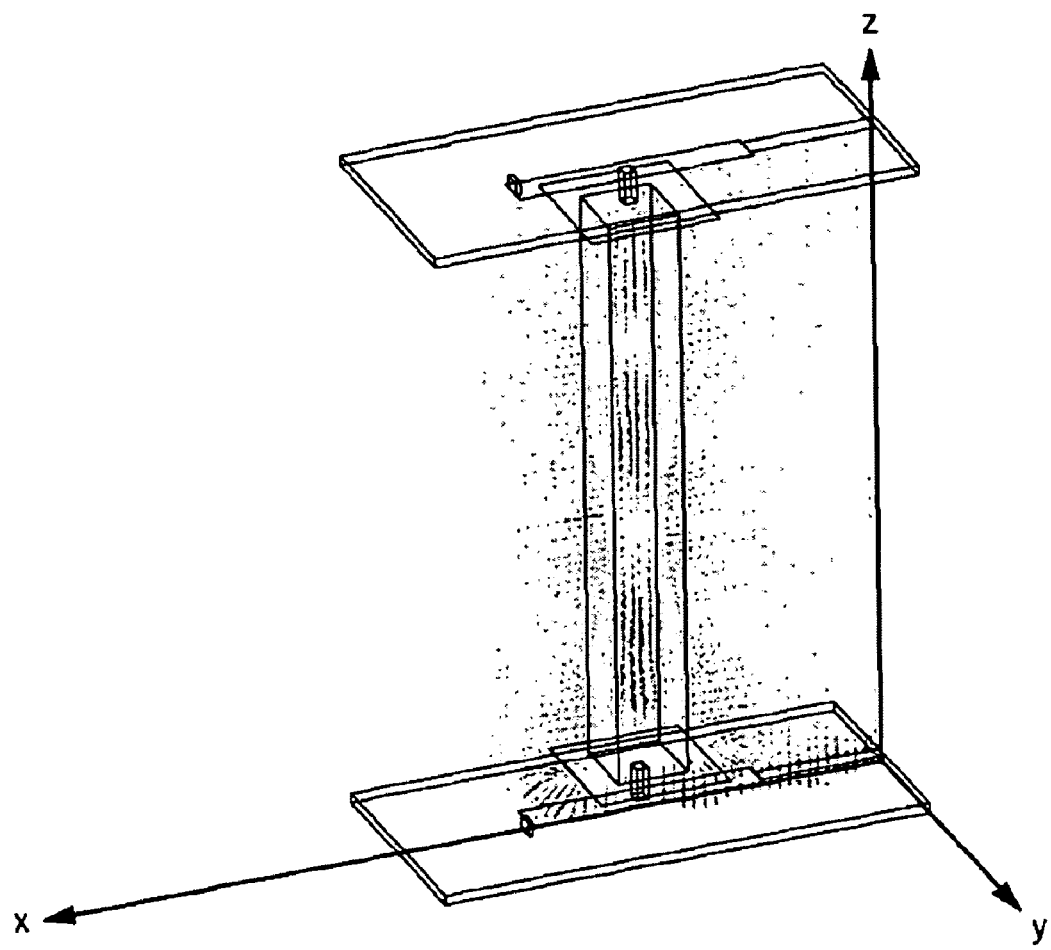
FIG. 28D illustrates a change in the distribution of electric fields in the zx plane for a half cycle at intervals of one-twelfth of a cycle in the case where an RF signal is transmitted through the intermediary of the surface-wave transmission line as in the structure illustrated in FIG. 27.
Figure 28E:
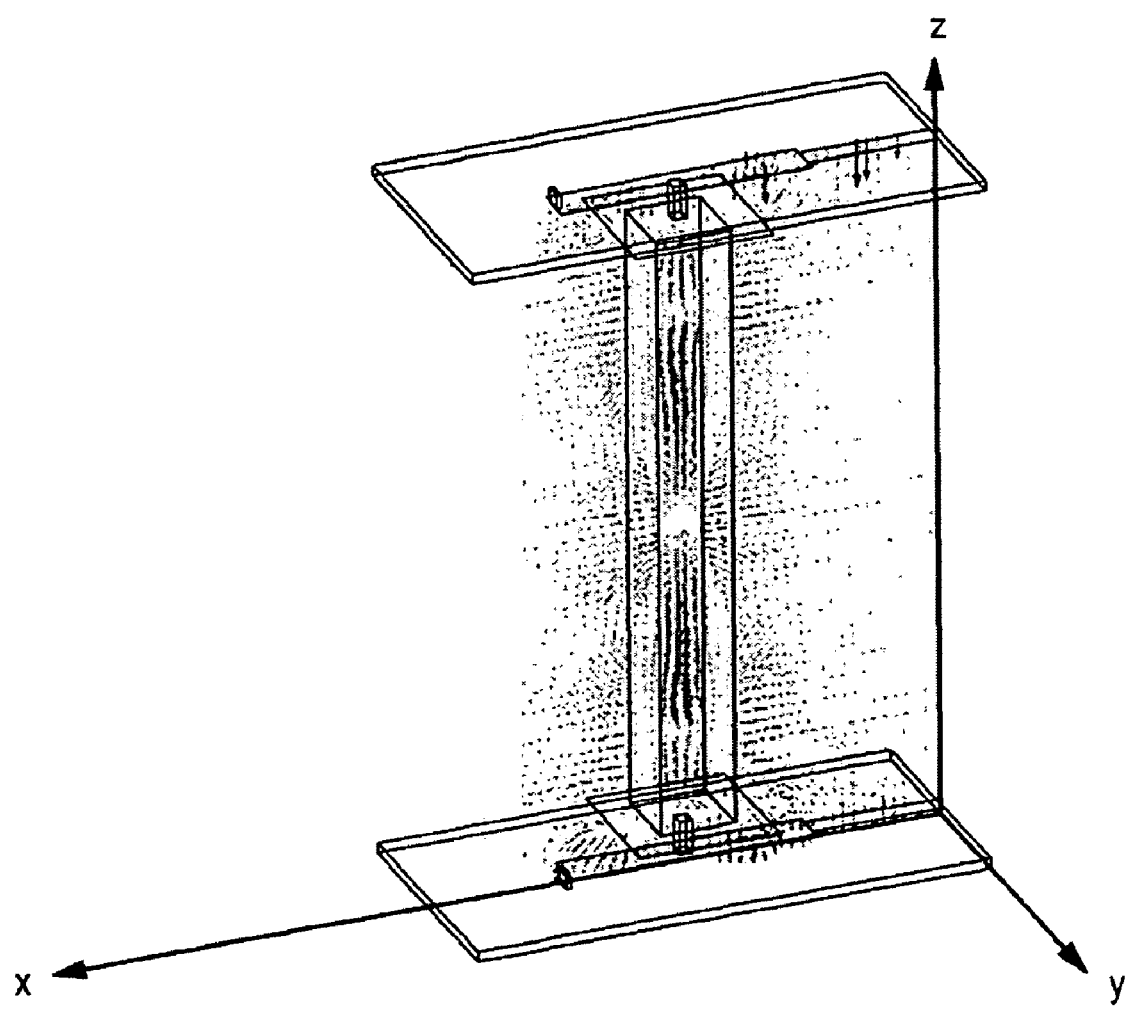
FIG. 28E illustrates a change in the distribution of electric fields in the zx plane for a half cycle at intervals of one-twelfth of a cycle in the case where an RF signal is transmitted through the intermediary of the surface-wave transmission line as in the structure illustrated in FIG. 27.
Figure 28F:
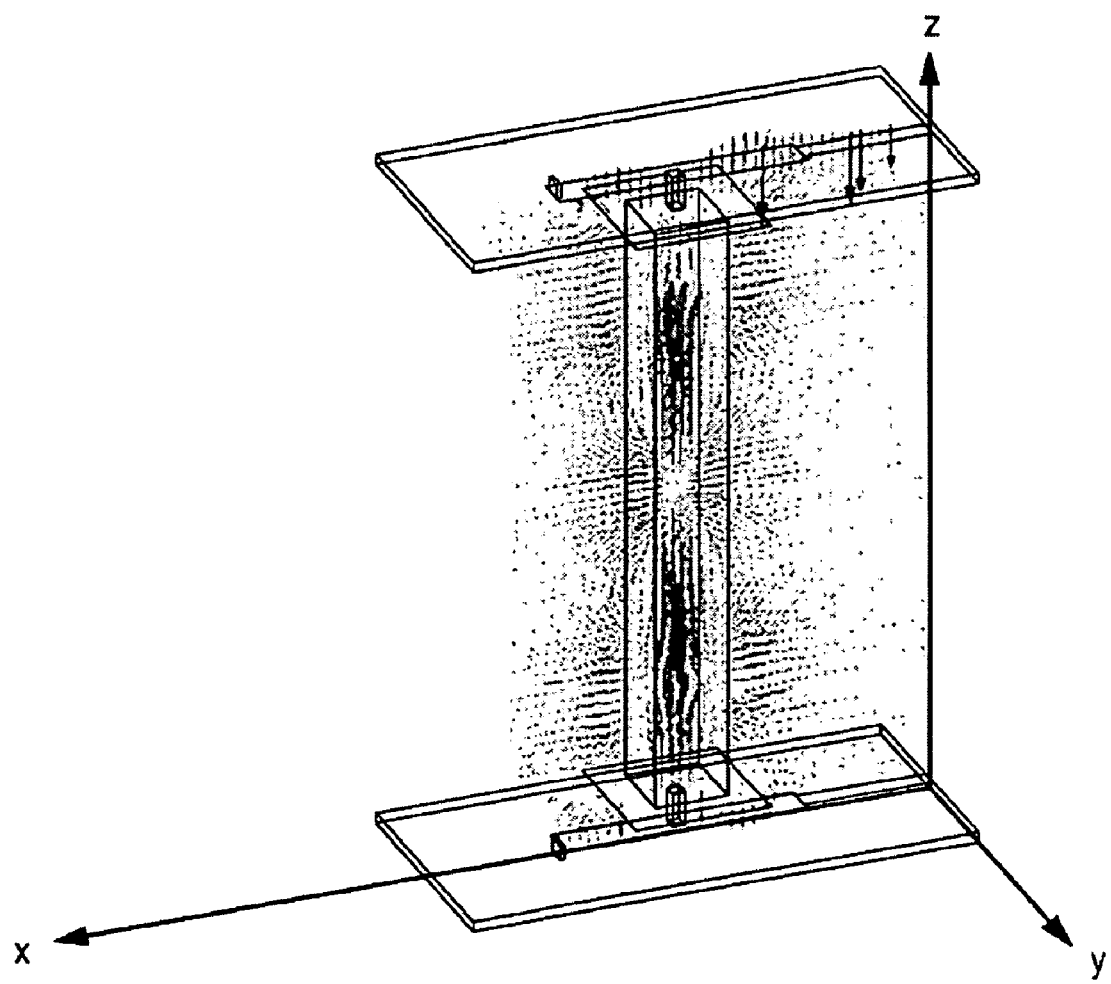
FIG. 28F illustrates a change in the distribution of electric fields in the zx plane for a half cycle at intervals of one-twelfth of a cycle in the case where an RF signal is transmitted through the intermediary of the surface-wave transmission line as in the structure illustrated in FIG. 27.
Figure 29A:
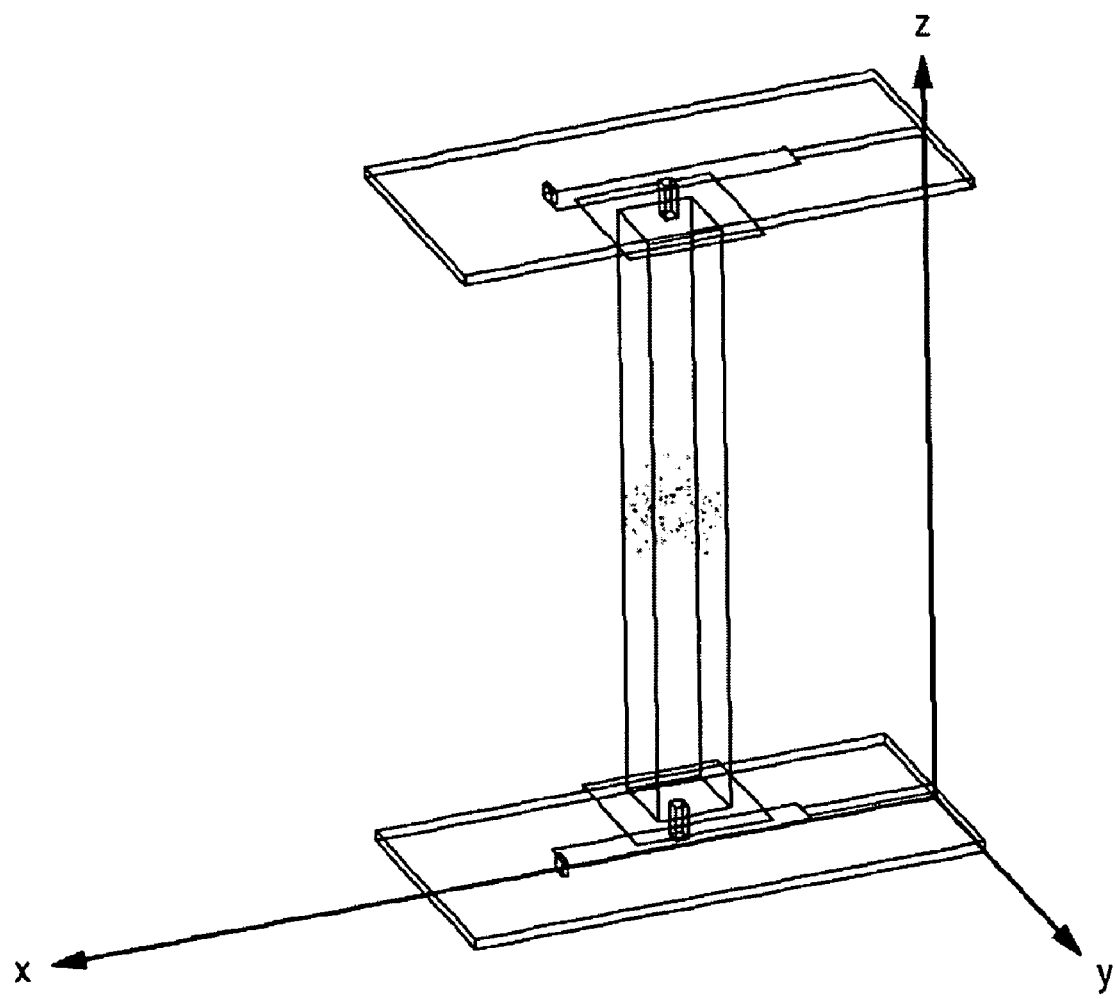
FIG. 29A illustrates a change in the distribution of magnetic fields in the xy plane for a half cycle at intervals of one-twelfth of a cycle in the case where an RF signal is transmitted through the intermediary of the surface-wave transmission line as in the structure illustrated in FIG. 27.
Figure 29B:
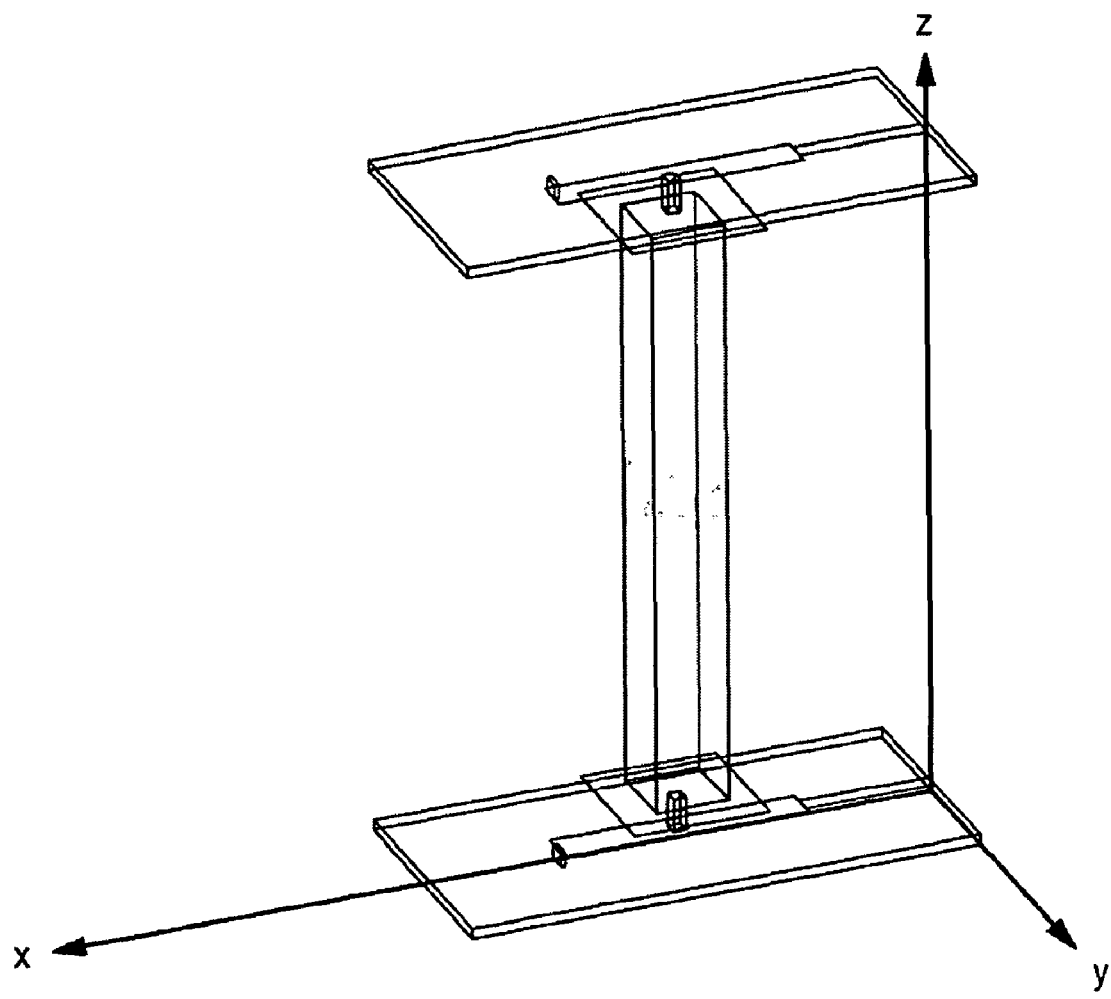
FIG. 29B illustrates a change in the distribution of magnetic fields in the xy plane for a half cycle at intervals of one-twelfth of a cycle in the case where an RF signal is transmitted through the intermediary of the surface-wave transmission line as in the structure illustrated in FIG. 27.
Figure 29C:
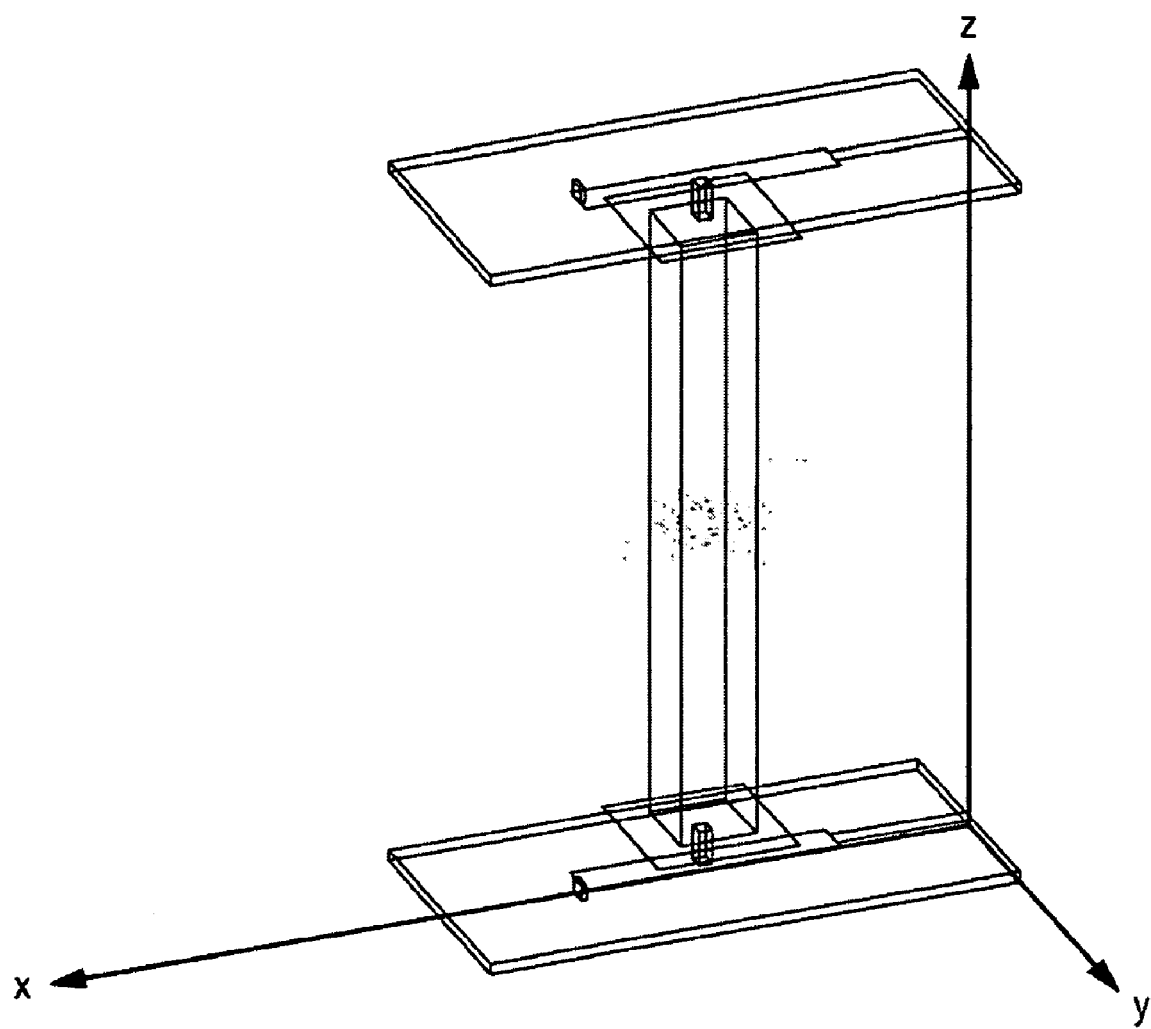
FIG. 29C illustrates a change in the distribution of magnetic fields in the xy plane for a half cycle at intervals of one-twelfth of a cycle in the case where an RF signal is transmitted through the intermediary of the surface-wave transmission line as in the structure illustrated in FIG. 27.
Figure 29D:
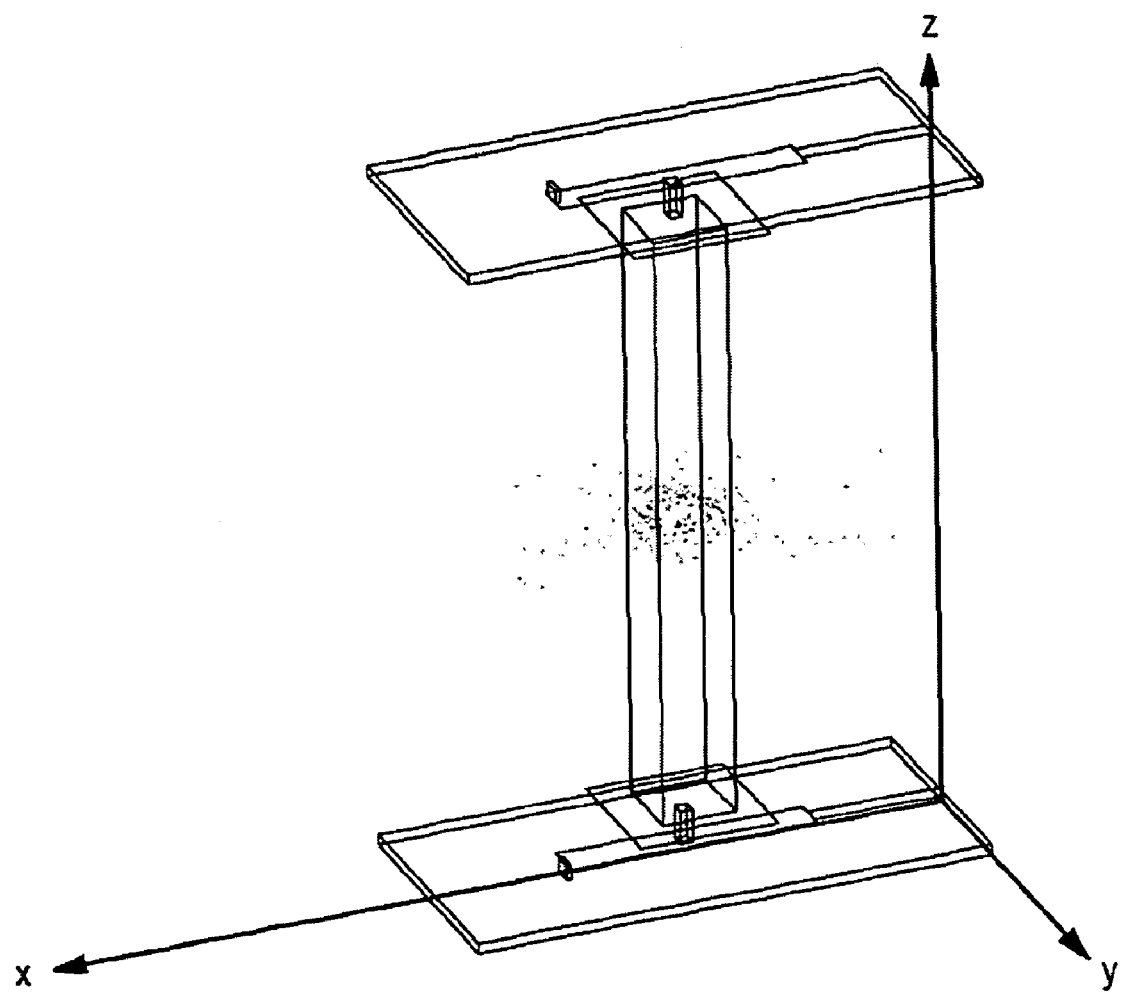
FIG. 29D illustrates a change in the distribution of magnetic fields in the xy plane for a half cycle at intervals of one-twelfth of a cycle in the case where an RF signal is transmitted through the intermediary of the surface-wave transmission line as in the structure illustrated in FIG. 27.
Figure 29E:
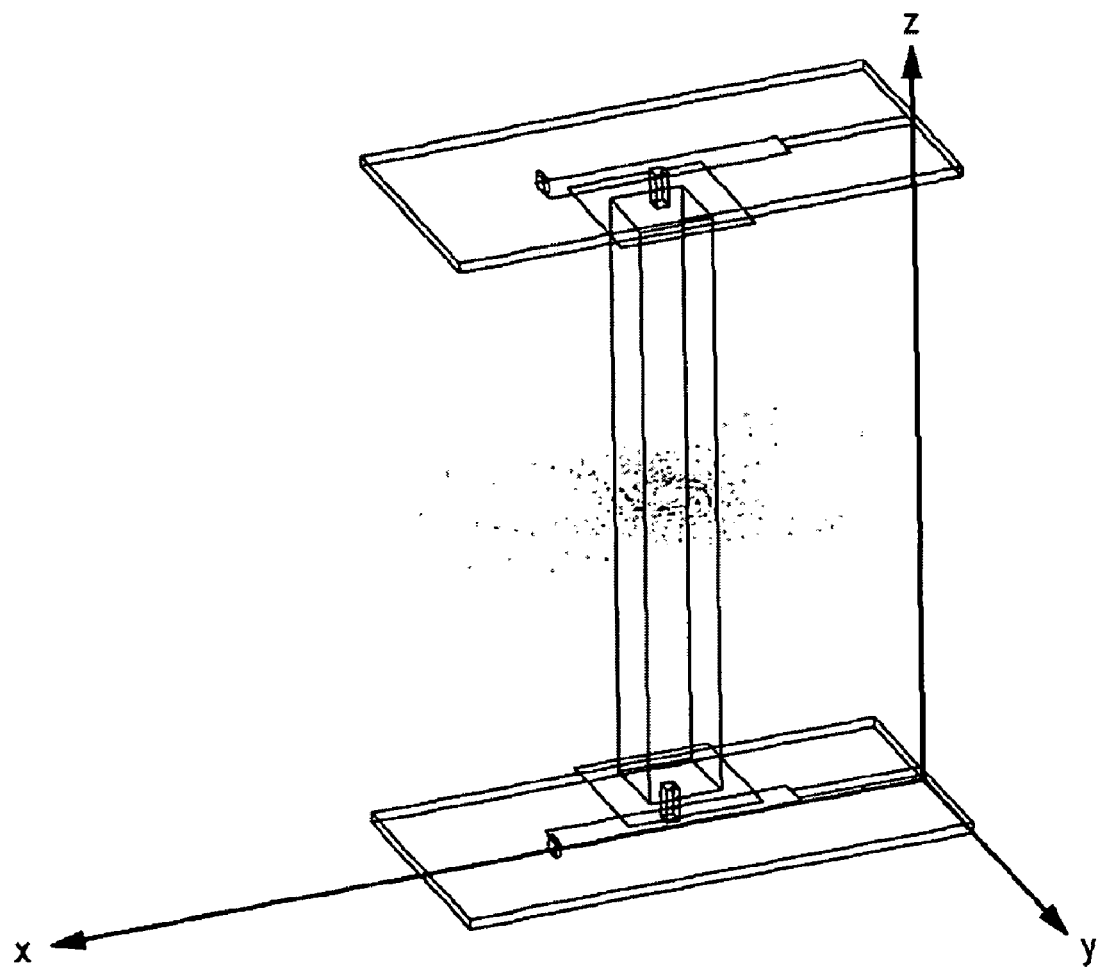
FIG. 29E illustrates a change in the distribution of magnetic fields in the xy plane for a half cycle at intervals of one-twelfth of a cycle in the case where an RF signal is transmitted through the intermediary of the surface-wave transmission line as in the structure illustrated in FIG. 27.
Figure 29F:
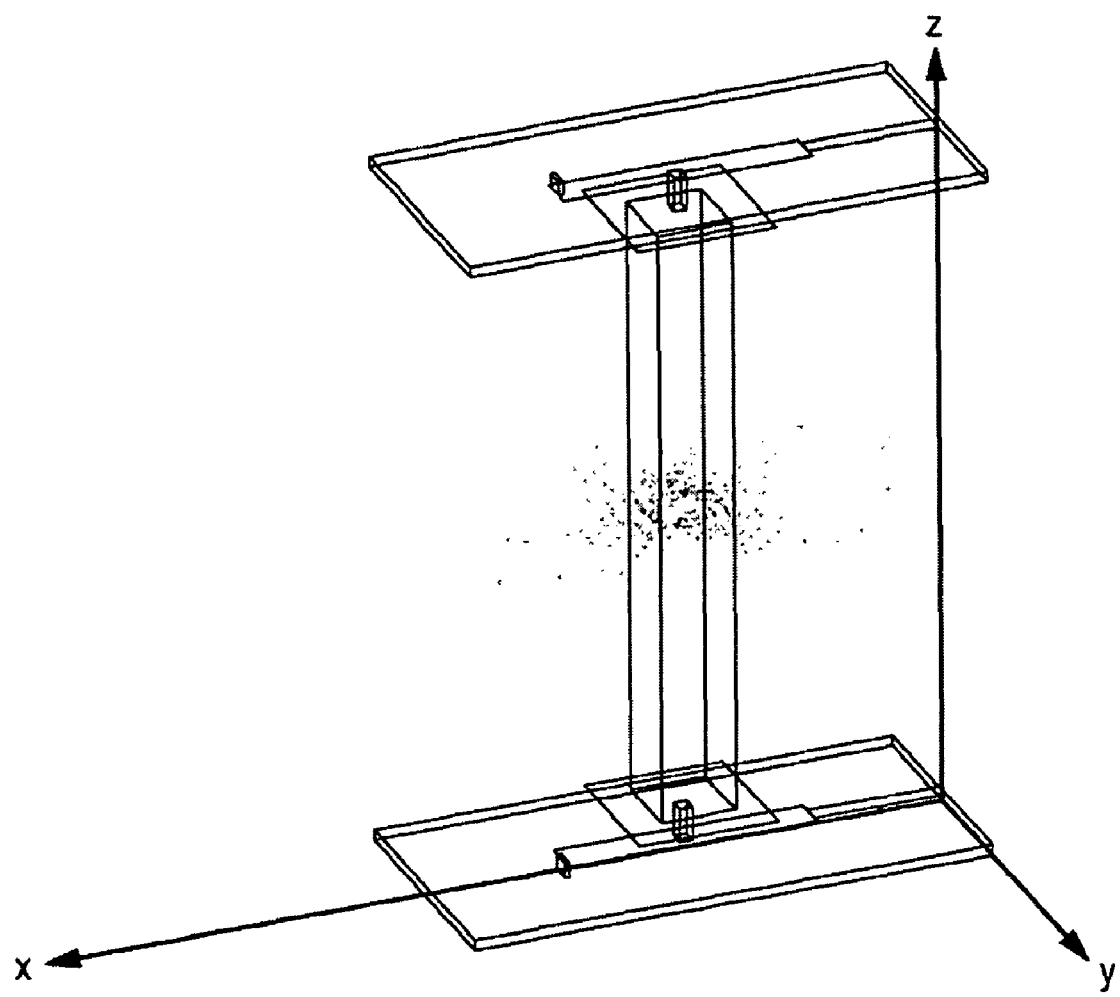
FIG. 29F illustrates a change in the distribution of magnetic fields in the xy plane for a half cycle at intervals of one-twelfth of a cycle in the case where an RF signal is transmitted through the intermediary of the surface-wave transmission line as in the structure illustrated in FIG. 27.

It is known that a change in an electric field over time induces a magnetic field. FIGS. 29A to 28F each illustrate a change in the distribution of magnetic fields in the xy plane for a half cycle at intervals of one-twelfth of a cycle in the case where an RF signal is transmitted through the intermediary of the surface-wave transmission line as in the structure illustrated in FIG. 27.

On the basis of FIGS. 28A to 29F, FIG. 30 schematically illustrates the distributions of electric fields and magnetic fields generated around the dielectric surface-wave transmission line. It has already been mentioned that a surface wave propagating along a transmission line includes the surface mode where energy is concentrated near the surface of the transmission line and the volume mode where energy is concentrated in the center of the transmission line. As is clear from FIG. 30, the energy of a surface wave propagating along the dielectric surface-wave transmission line is distributed near the central axis along which a longitudinal wave component propagates (volume mode) and near the surface on which a transverse wave component propagates (surface mode). That is, an electric field perpendicular to the surface of the dielectric is generated near the surface of the dielectric, and a longitudinal-wave electric field (including the above-mentioned total reflection component) causing vibration substantially parallel to the direction of travel is generated in the central portion inside the dielectric. Further, a magnetic field is generated so as to be wound around the central axis of the dielectric in accordance with changes in these two types of electric fields. Accordingly, a signal propagates.

In this case, a suitable magnetic field is generated, which interacts with an electric field in the case where the direction or strength of current or magnetism changes (in an alternating manner). Therefore, when an electric field exists, so does a magnetic field; when a magnetic field exists, so does an electric field. Accordingly, a surface-wave signal is expected to propagate far away while changing its energy form back and forth between an electric field and a magnetic field. In contrast, a magnetic surface-wave transmission line with a relative magnetic permeability of 1 has difficulty in capturing a signal since only an electric field component is generated from the EFC antenna.

Figure 31A:
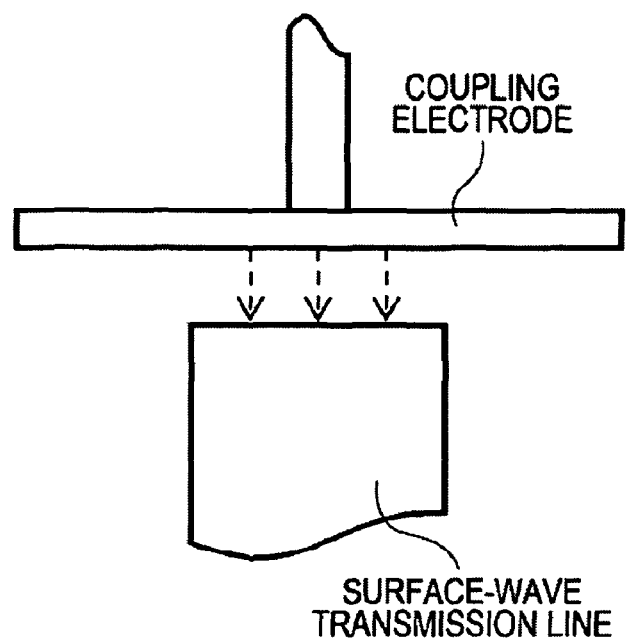
FIG. 31A is a diagram of the propagation of a longitudinal-wave electric field $E_R$ generated on the surface of a coupling electrode of an EFC antenna as a surface wave at an end of a dielectric surface-wave transmission line.
Figure 31B:
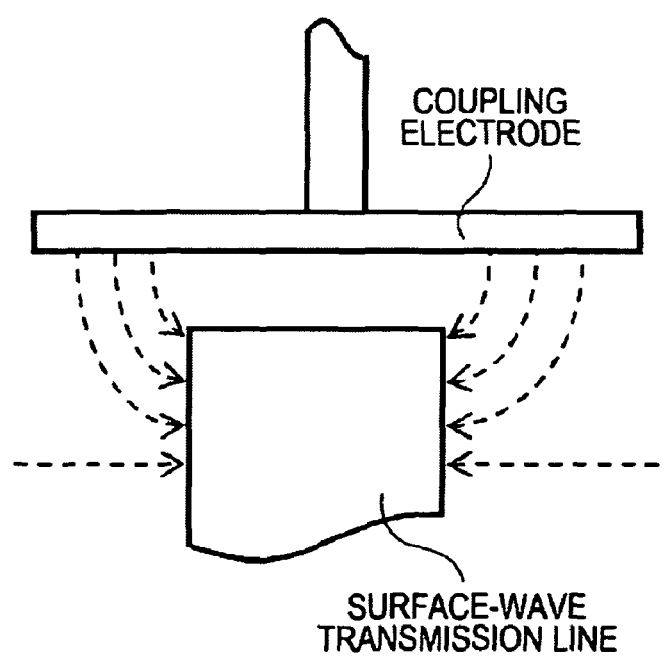
FIG. 31B is a diagram of the propagation of a longitudinal-wave electric field $E_R$ generated on the surface of a coupling electrode of an EFC antenna as a surface wave at an end of a dielectric surface-wave transmission line.

FIGS. 31A and 31B illustrate the propagation of a longitudinal-wave electric field $E_R$ generated on the surface of a coupling electrode of an EFC antenna as a surface wave at an end of a dielectric surface-wave transmission line. In the case where the longitudinal-wave electric field $E_R$ generated on the surface of the coupling electrode is incident on one end face of the surface-wave transmission line, as illustrated in FIG. 31A, the longitudinal wave component propagates near the central axis of the surface-wave transmission line in the volume mode. In the case where the longitudinal-wave electric field $E_R$ generated on the surface of the coupling electrode is perpendicularly incident on the outer periphery near the end of the surface-wave transmission line, as illustrated in FIG. 31B, a transverse wave component propagates near the surface of the surface-wave transmission line in the surface mode.

In this manner, in the case where a surface wave propagates along a dielectric surface-wave transmission line, the volume mode and the surface mode exist. The energy is transmitted in both the volume mode and the surface mode. In order to receive a surface wave emitted from the EFC antenna without any loss, it is preferable that the area of one end face of the surface-wave transmission line (thickness of the transmission line) be sufficiently large with respect to the size of the coupling electrode.

Figure 32:
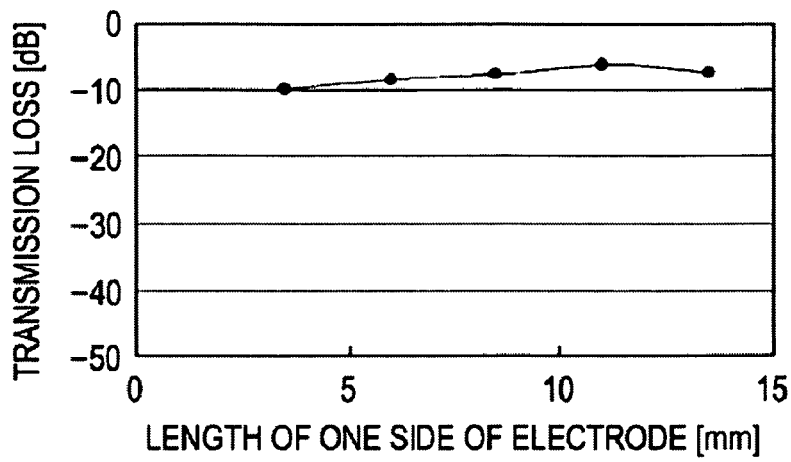
FIG. 32 is a graph of the result of obtaining a propagation loss $S_{21}$ in the case where, in the structure illustrated in FIG. 27, the size of a coupling electrode of a transmitter and the size of a coupling electrode of a receiver are changed, the result being obtained by a simulation using a finite element method.

FIG. 32 shows the result of obtaining a propagation loss $S_{21}$ in the case where the size of coupling electrodes of a transmitter and a receiver is changed in the structure illustrated in FIG. 27, the result being obtained by a simulation using a finite element method. The simulation assumed that the surface-wave transmission line was a dielectric with a relative dielectric constant of 10, a relative magnetic permeability of 10, an electric conductivity of 0 [Siemens/m], a cross-sectional area of 6 mm×6 mm, and a length of 49.6 mm. The distance between each of two end faces of the surface-wave transmission line and a corresponding coupling electrode was set to 50 mm, and the operating frequency was set to 4.5 GHz. Each EFC antenna included a square-shaped coupling electrode whose height was 3 mm, which was disposed on a ground board with an area of 20 mm×42 mm, a thickness of 0.8 mm, and a dielectric constant of 3.4. Each resonating section included a stub (described above) with a length of 20 mm and a width of 3 mm. The length of one side of the coupling electrode was variable. It is clear from FIG. 32 that the propagation loss $S_{21}$ is substantially constant in the case where the thickness of the surface-wave transmission line does not change.

Figure 33:
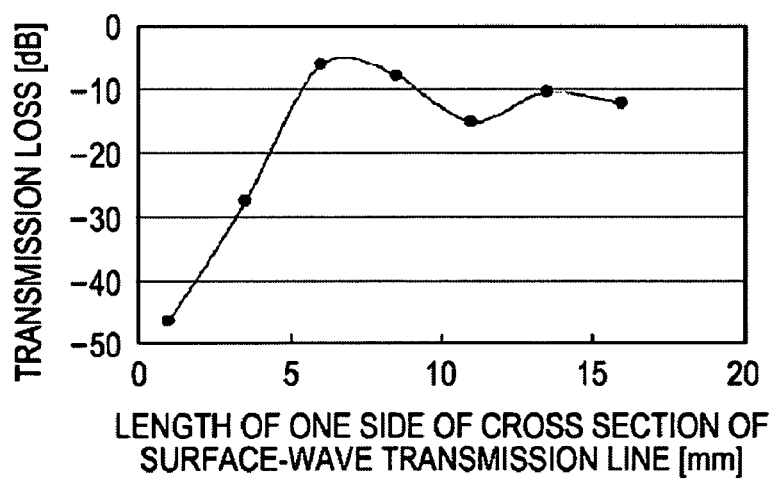
FIG. 33 is a graph of the result of obtaining the propagation loss $S_{21}$ in the case where, in the structure illustrated in FIG. 27, the thickness of the surface-wave transmission line is changed, the result being obtained by a simulation using a finite element method.

FIG. 33 is a graph of the result of obtaining the propagation loss $S_{21}$ in the case where the thickness of the surface-wave transmission line is changed in the structure illustrated in FIG. 27, the result being obtained by a simulation using a finite element method. The operating frequency was set to 4.5 GHz. The simulation assumed that the surface-wave transmission line was a dielectric with a relative dielectric constant of 10, a relative magnetic permeability of 10, an electric conductivity of 0 [Siemens/m], and a length of 49.6 mm. The distance between each of two end faces of the surface-wave transmission line and a corresponding coupling electrode was set to 50 mm, and the cross-sectional area thereof was variable. Each EFC antenna included a coupling electrode whose area was 11 mm×11 mm and whose height was 3 mm, which was disposed on a ground board with an area of 20 mm×42 mm, a thickness of 0.8 mm, and a dielectric constant of 3.4. Each resonating section included a stub (described above) with a length of 20 mm and a width of 3 mm. It is clear from FIG. 33 that the propagation loss $S_{21}$ changes with the thickness of the surface-wave transmission line.

Figure 34:
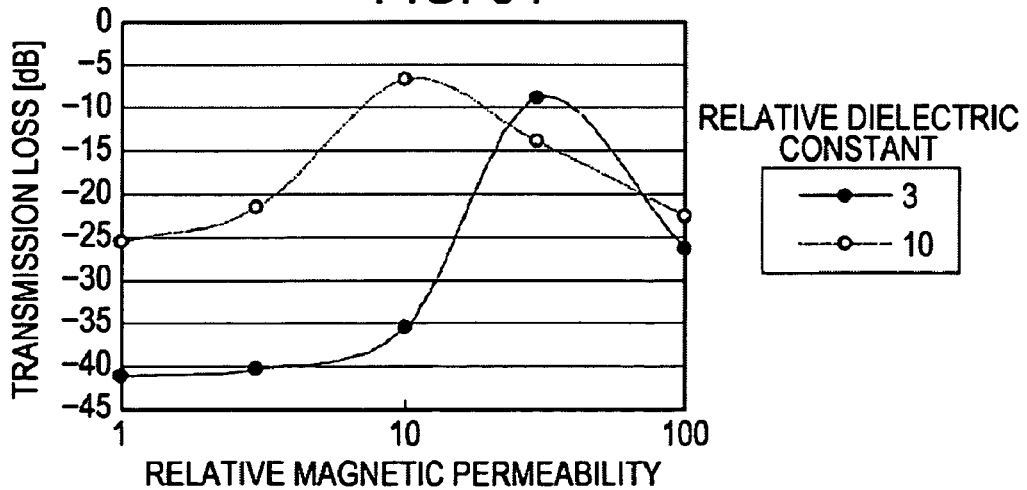
FIG. 34 is a graph of the result of obtaining the propagation loss $S_{21}$ in the case where, in the structure illustrated in FIG. 27, the relative dielectric constant and the relative magnetic permeability of the surface-wave transmission line are changed, the result being obtained by a simulation using a finite element method.

FIG. 34 is a graph of the result of obtaining the propagation loss $S_{21}$ in the case where the relative dielectric constant and the relative magnetic permeability of the surface-wave transmission line are changed in the structure illustrated in FIG. 27, the result being obtained by a simulation using a finite element method. The operating frequency was set to 4.5 GHz. Each EFC antenna included a coupling electrode whose area was 11 mm×11 mm and whose height was 3 mm, which was disposed on a ground board with an area of 20 mm×42 mm, a thickness of 0.8 mm, and a dielectric constant of 3.4. Each resonating section included a stub (described above) with a length of 20 mm and a width of 3 mm. The simulation assumed that the surface-wave transmission line had a cross-sectional area of 6 mm×6 mm and a length of 49.6 mm. The distance between each of two end faces of the surface-wave transmission line and a corresponding coupling electrode was set to 50 mm. It is clear from FIG. 34 that the propagation loss $S_{21}$ changes with the relative dielectric constant and the relative magnetic permeability of the surface-wave transmission line.

The propagation loss $S_{21}$ of the dielectric surface-wave transmission line is dependent on the frequency, the relative dielectric constant and the relative magnetic permeability of the transmission line, and the thickness of the surface-wave transmission line. Taking into consideration the simulation results indicated in FIGS. 32 to 34, a signal propagates efficiently with less loss in the case where, for example, the frequency is 4.5 GHz, the relative dielectric constant is 10, the relative magnetic permeability is 10, and the thickness (or the cross-sectional area) of the surface-wave transmission line is approximately 6 mm×6 mm.

It is known that a surface wave propagates along the surface of a conductor, such as a metal line, besides the interior of a dielectric or a magnetic body. In the case where a magnetic surface-wave transmission line is used, only an electric field component is generated from an EFC antenna, and hence a magnetic body with a relative dielectric constant of 1 has difficulty in capturing a signal. A magnetic body with a relative dielectric constant of greater than 1 can efficiently transmit a surface wave, though with a large surface-wave propagation loss. In the case where a dielectric surface-wave transmission line is used, a signal propagates via an electric field perpendicular to the surface of the dielectric, a longitudinal-wave electric field causing vibration parallel to the direction of travel, which is generated in the center of the dielectric, and a magnetic field generated so as to be wound around the central axis of the dielectric.

Figure 17A:
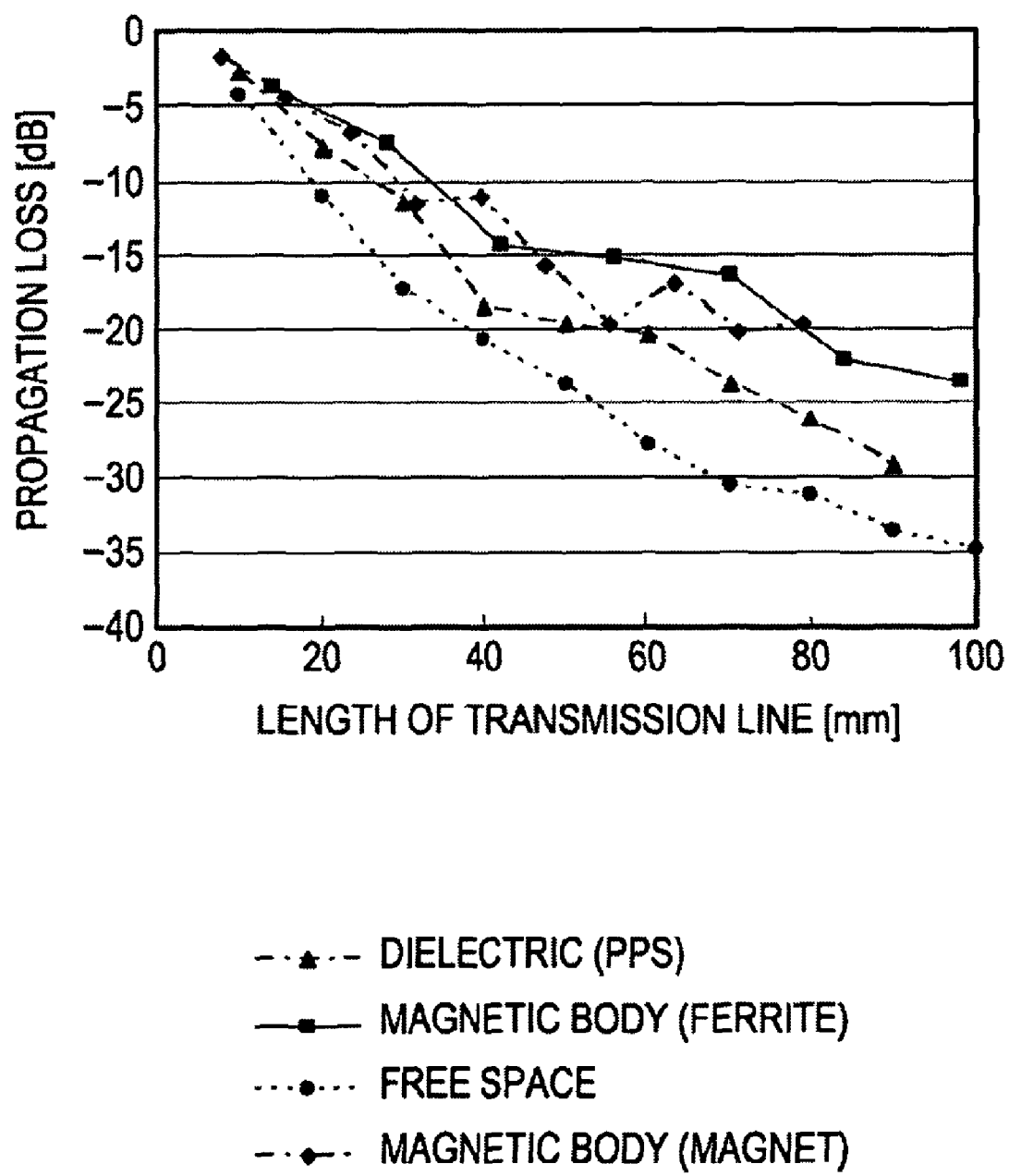
FIG. 17A is a graph of the relationship between the length of a surface-wave transmission line and a propagation loss in the case where a polyphenylene sulfide (PPS) resin serving as a dielectric, a nickel-zinc (NiZn) ferrite serving as a magnetic body, or a magnet is used as the surface-wave transmission line.

FIG. 17A illustrates the relationship between the length of a surface-wave transmission line and the propagation loss $S_{21}$ in the case where a polyphenylene sulfide (PPS) resin serving as a dielectric, a nickel-zinc (NiZn) ferrite serving as a magnetic body, or a magnet is used as the surface-wave transmission line. Note that the PPS has a dielectric constant of 5 to 12, a dielectric loss tangent of 0.002, and a diameter of 10 mm; the NiZn ferrite has a diameter of 9 mm (internal diameter of 5 mm); and the magnet has a diameter of 6 mm (see FIG. 17B). The propagation loss $S_{21}$ of the surface-wave transmission line is the loss of a surface wave propagating from the surface-wave transmission line at the transmitter side (Port 1) to the surface-wave transmission line at the receiver side (Port 2) in the case where the surface-wave transmission line is interposed between electrodes (see FIG. 17C). It is clear from FIG. 17A that the propagation loss is reduced through the intermediary of the surface-wave transmission line interposed between the EFC antennas of the transmitter and the receiver, compared with the case where a surface wave propagates in free space, that is, without any surface-wave transmission line being provided.

Figure 7:
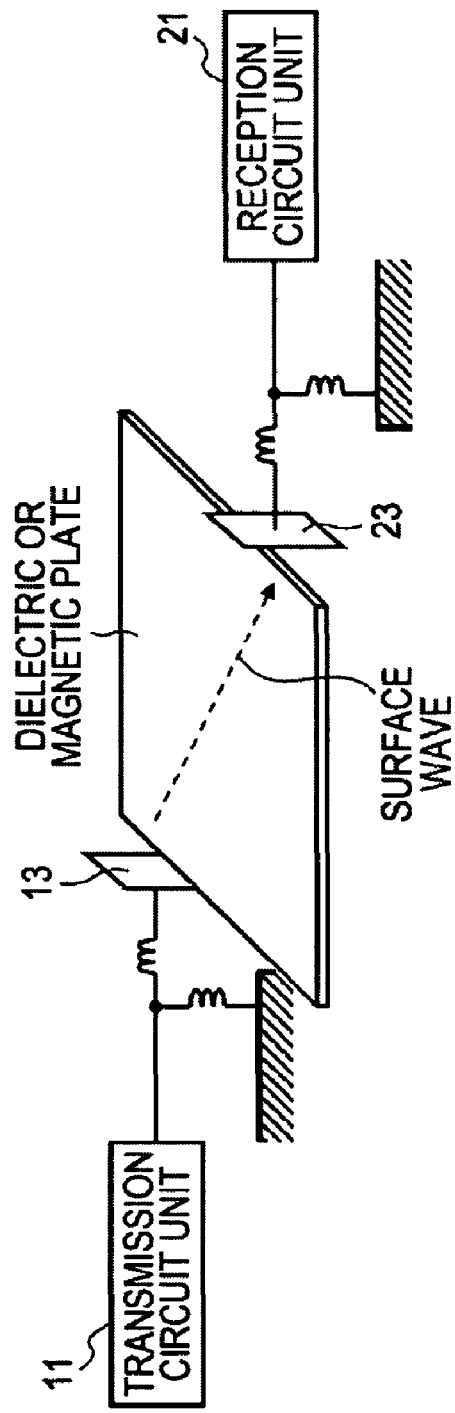
FIG. 7 is a diagram of an exemplary surface-wave transmission line formed as a plate.

The dielectric or magnetic surface-wave transmission line 30 is not limited to a particular shape. For example, the surface-wave transmission line 30 can be a plate as illustrated in FIG. 7, a strip as illustrated in FIG. 8, or a line as illustrated in FIG. 9. Alternatively, in the case of a surface-wave transmission line having a pyramid shape as illustrated in FIG. 10, whose vertex is directed to a particular receiver, a surface wave emitted from the coupling electrode of the transmitter is captured at the bottom surface of the surface-wave transmission line, which can thereafter be allowed to propagate and to be concentrated at the vertex. Accordingly, efficient propagation can be implemented. For example, a transmission line with such a structure is advantageous in performing one-way communication from one communication apparatus to another.

As illustrated in FIG. 11, the surface of a dielectric surface-wave transmission line 30 with a higher dielectric constant may be covered with another dielectric outer layer 31 with a lower dielectric constant. Accordingly, even when a surface wave is not reflected at the surface of the dielectric with the higher dielectric constant and passes therethrough, this surface wave is reflected at the surface of the other dielectric covering the former dielectric with the higher dielectric constant and returns to the dielectric layer in the center. That is, the amount of a surface wave which propagates through the surface-wave transmission line 30 and emanates to the outside as a transmitted wave can be reduced, and a signal can be transmitted more efficiently.

Figure 12:
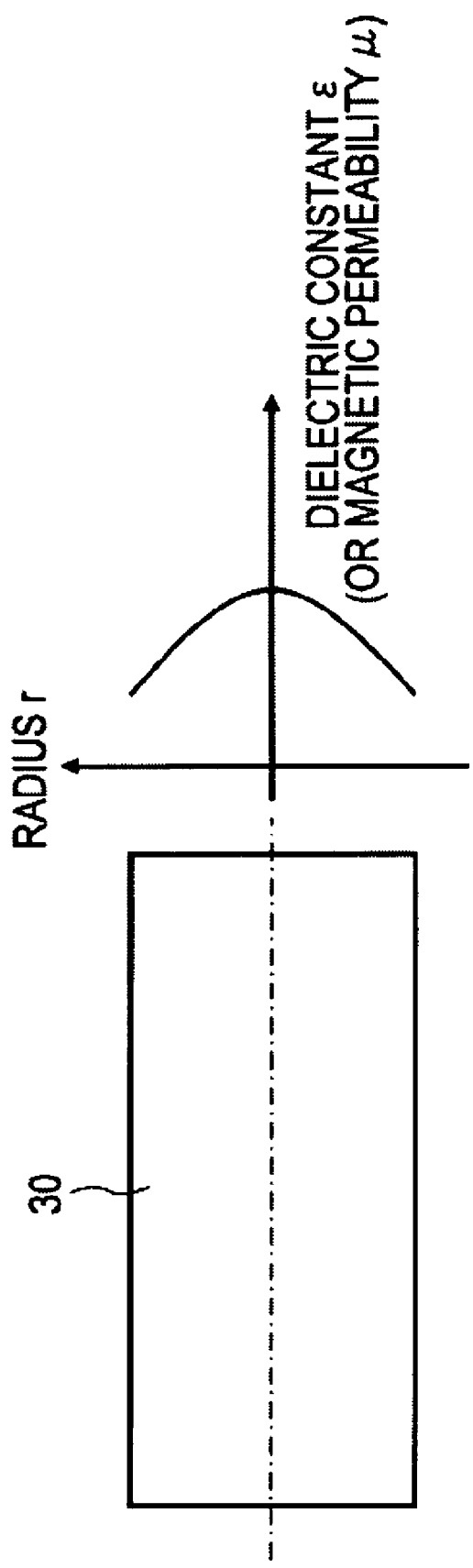
FIG. 12 is a diagram of an exemplary surface-wave transmission line whose dielectric constant changes continuously with a distance r from the center.

A similar advantage can be achieved by forming two or more outer layers with different dielectric constants ∈ (or magnetic permeabilities μ) as illustrated in FIG. 11 in which the dielectric constant becomes smaller toward the outer part. In the case where the dielectric constant ∈ (or magnetic permeability μ) changes continuously with a distance r from the center as illustrated in FIG. 12, instead of the case where the dielectric constant ∈ (or magnetic permeability μ) changes step by step according to the distance r from the center, the amount of a surface wave emanating as a transmitted wave outside the surface-wave transmission line 30 can be reduced in a similar manner.

FIG. 13 illustrates a dielectric (or magnetic body) with a higher dielectric constant ∈ (or with a higher magnetic permeability μ) serving as the surface-wave transmission line 30, which is embedded in another dielectric (or magnetic body) with a lower dielectric constant ∈ (or with a lower magnetic permeability μ). The object in which the dielectric with a higher dielectric constant ∈ (or the magnetic body with a higher magnetic permeability μ) is embedded can be configured as a member, such as a rack, for locating the coupling electrodes 13 and 23 of the transmitter 10 and the receiver 20.

FIG. 14 illustrates the surface-wave transmission line 30 including, instead of one dielectric (or magnetic body), a plurality of separate dielectrics (or magnetic bodies). Since the surface-wave transmission line 30 can be separated into portions and the separate portions can be used without touching each other, the communication system according to the embodiment can be applied to contactless communication in which devices or a device and a member do not have a physical contact with each other. The separate dielectric portions are not necessarily in contact with each other; it is preferable that the gap between the dielectric portions be as small as possible in order to reduce loss, and that the dielectric portions be placed such that signal transmission faces thereof can face each other.

Figure 15:
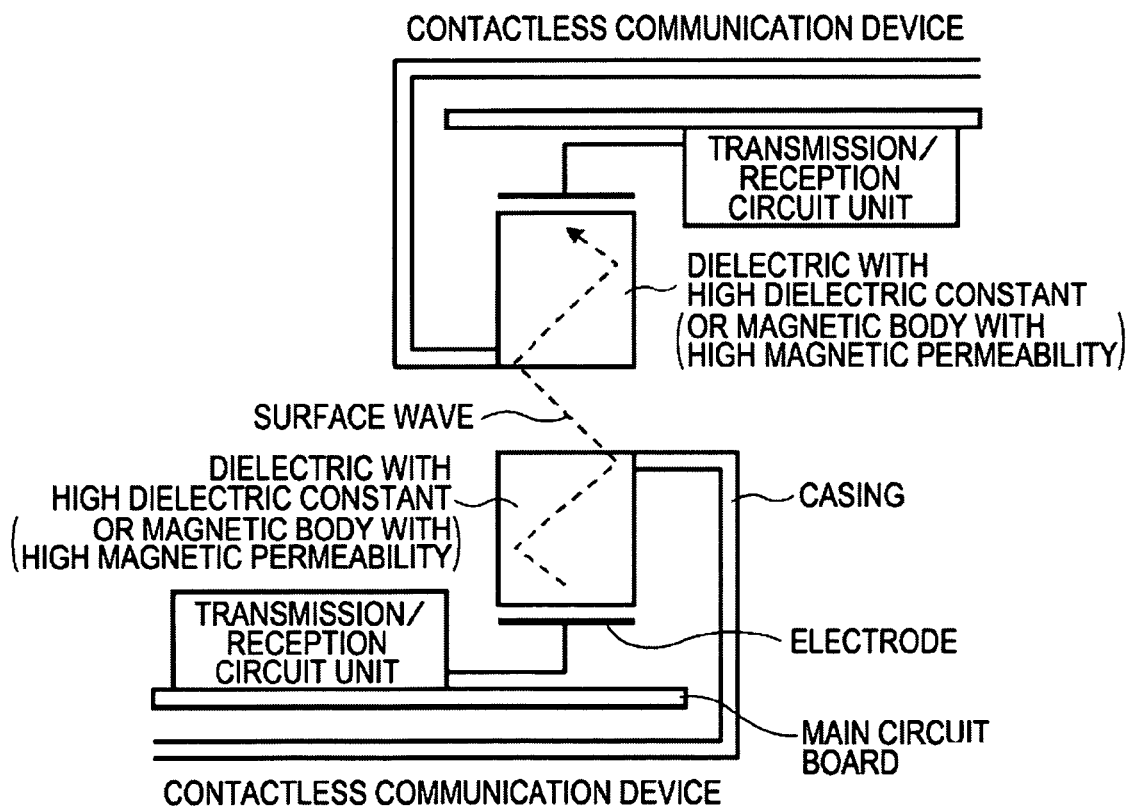
FIG. 15 is a diagram of an exemplary structure of a contactless communication device using a surface-wave transmission line.

FIG. 15 illustrates an exemplary structure of each contactless communication device using a surface-wave transmission line. In the example illustrated in FIG. 15, transmission/ reception circuit units and coupling electrodes are mounted on main circuit boards in respective contactless communication devices. In the case where nothing is placed in front of each electrode, which is housed deep inside a corresponding casing, a signal emitted from the electrode is dispersed in air in the casing and is lost. In contrast, according to a communication device with the structure illustrated in FIG. 15, in the case where a dielectric or a magnetic body serving as a surface-wave transmission line is disposed in front of each coupling electrode, an electromagnetic field emanating from the coupling electrode is guided by the surface-wave transmission line to a desired region of the surface of the casing, whereby the signal can be transmitted efficiently.

The foregoing description concerns the mechanism in which, in the communication system illustrated in FIG. 3, a signal is transmitted between a pair of EFC antennas through the intermediary of a surface-wave transmission line. The transmission of a signal between two devices necessarily involves the transfer of energy. Therefore, this type of communication system can be applied to electric power transfer. As has been described above, the electric field $E_R$ generated by the EFC antenna of the transmitter propagates as a surface wave along the surface-wave transmission line. The receiver side can reliably obtain power by rectifying and stabilizing a signal received by the EFC antenna.

Figure 35:
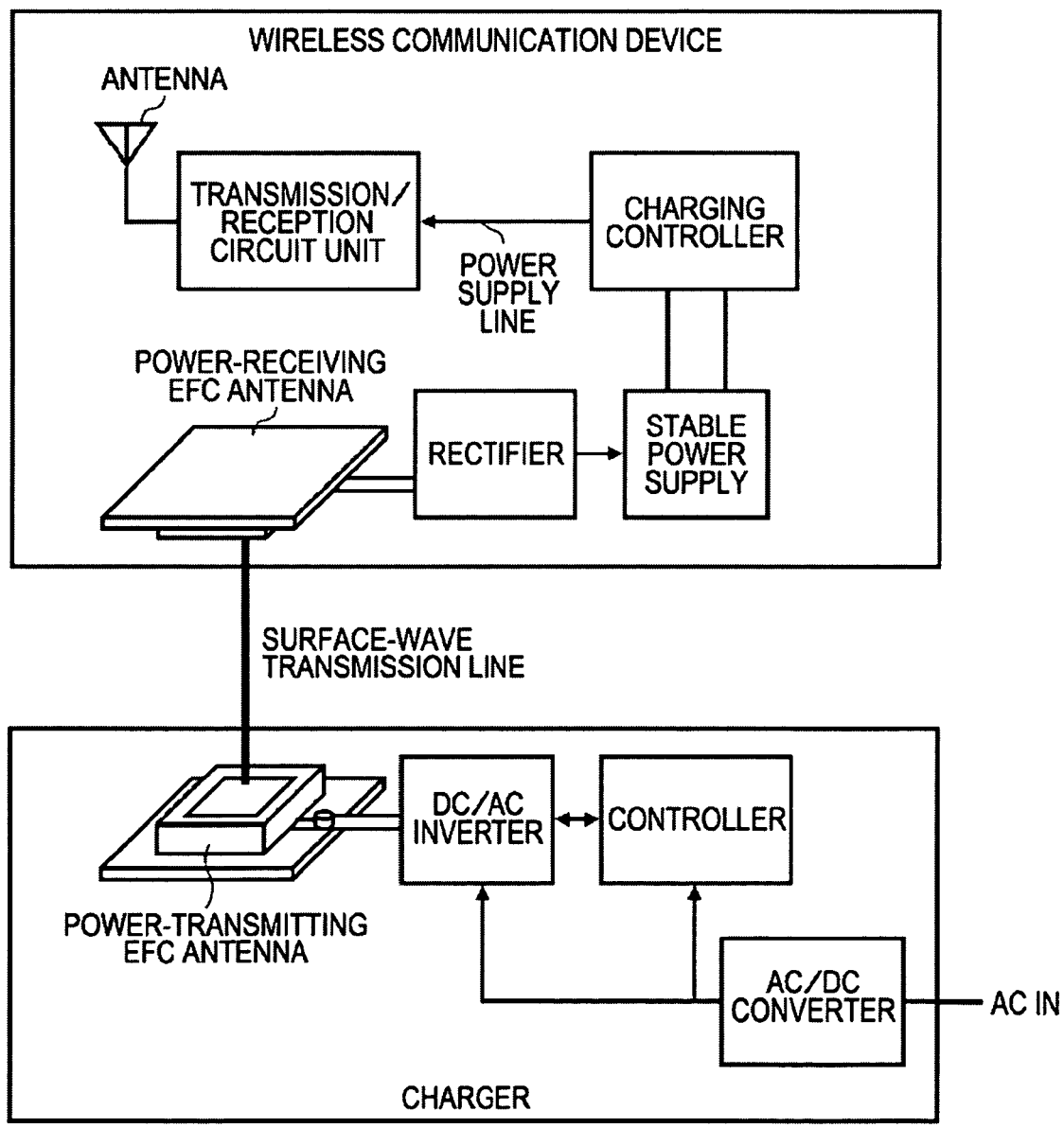
FIG. 35 is a diagram of an exemplary structure of the case where the communication system illustrated in FIG. 3 is applied to electric power transfer.

FIG. 35 illustrates an exemplary structure of the case where the communication system illustrated in FIG. 3 is applied to electric power transfer.

In the illustrated system, with EFC antennas included in a charger connected to an alternating current (AC) power supply and in a wireless communication device, power can be transmitted and charged to the wireless communication device via a surface-wave transmission line interposed therebetween. The EFC antennas are used only to transfer electric power.

In the case where no power-receiving EFC antenna is located near the power-transmitting EFC antenna, most of the power input to the power-transmitting EFC antenna is reflected back to a direct-current (DC)/AC inverter. Therefore, the emission of unnecessary radio waves to the outside and the consumption of power beyond necessity can be suppressed.

Although the example illustrated in the diagram concerns the case where the wireless communication device is charged with power, a device charged with power is not limited to a wireless device. For example, electric power can be transferred in a contactless manner to a music player or a digital camera.

Figure 36:
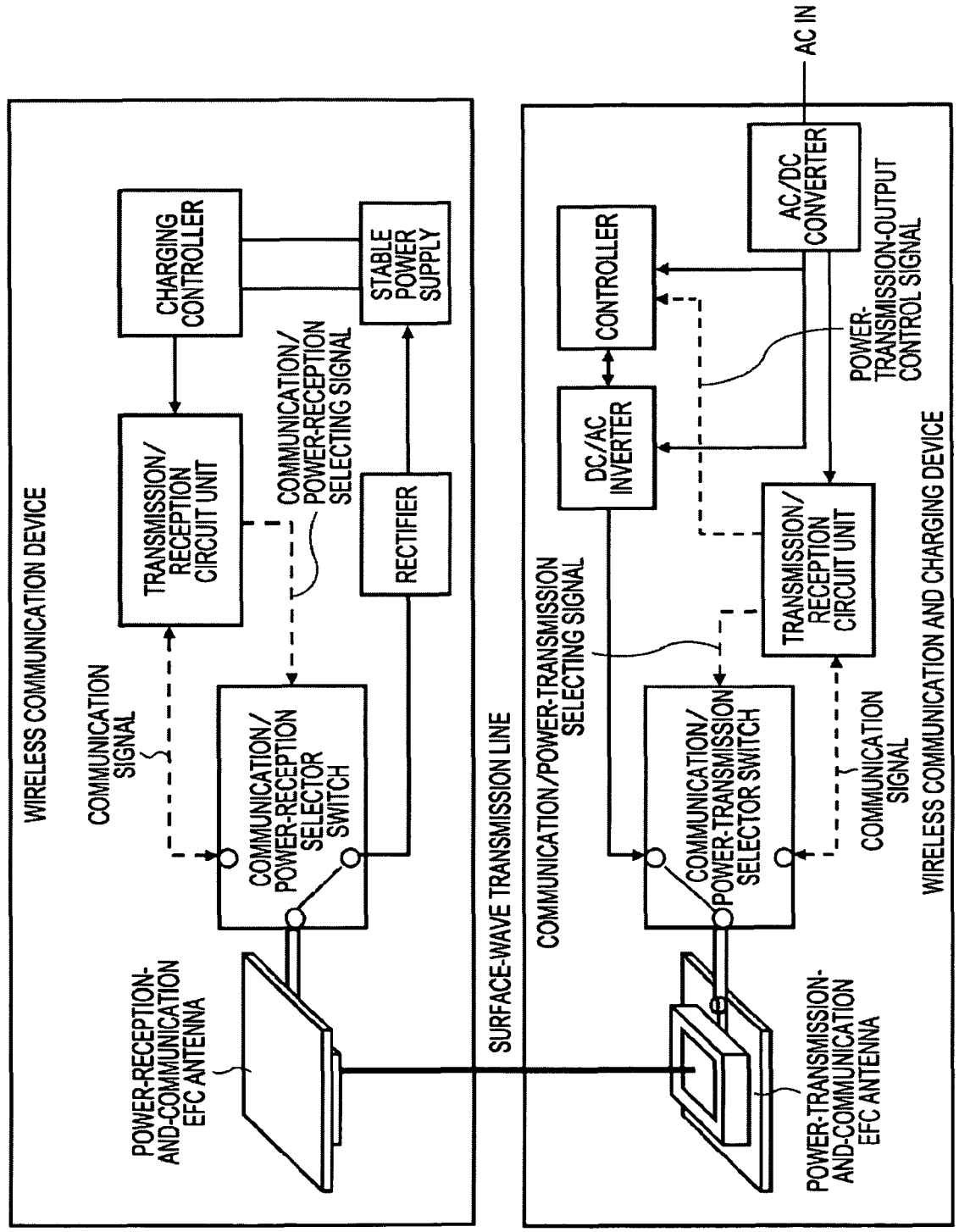
FIG. 36 is a diagram of another exemplary structure of the case where the communication system illustrated in FIG. 3 is applied to electric power transfer.

FIG. 36 illustrates another exemplary structure of the case where the communication system illustrated in FIG. 3 is applied to electric power transfer. In the illustrated system, the EFC antennas and the surface-wave transmission line are used to both transfer electric power and perform communication.

The timing to switch between communication and power transmission is controlled by a communication/power transmission-(reception)-switching signal sent from a transmission circuit unit. Alternatively, communication and power transmission can be alternately performed on a predetermined cycle. In this case, the power transmission output can be maintained at an optimum level by feeding back a charging status in addition to a communication signal to the charger. For example, when charging is completed, information indicating the completion is sent to the charger, thereby changing the power transmission output to zero. Alternatively, communication data can be superimposed on power.

Although the charger is connected to the AC power supply in the system illustrated in the drawings, the system may be applicable to the case where power is supplied from a cellular phone to another cellular phone with low battery power remaining therein.

The present invention has been described hereinabove in the context of specific embodiments thereof. It is to be understood, however, that modifications of or alternatives to the embodiments can be made by those skilled in the art without departing from the scope of the present invention.

In this specification, the embodiments applied to communication systems in which data, such as a UWB signal, is transmitted using electric-field coupling in a cableless manner have been mainly described. However, the scope of the present invention is not limited thereto. The present invention is similarly applicable to, for example, a communication system using an RF signal other than that in the UWB communication scheme or a communication system performing data transmission of a relatively low frequency signal using electric-field coupling.

In this specification, the embodiments applied to systems in which data is communicated between a pair of EFC antennas through the intermediary of a surface-wave transmission line interposed therebetween have been mainly described. Since the transmission of a signal between two devices necessarily involves the transfer of energy, this type of communication system can also be applied to electric power transfer.

In short, the present invention has been disclosed by way of examples, and the disclosure should not be construed as the restrictive one. Reference shall be made to the appended claims for delineation of the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system, comprising:
   a transmitter including a transmission circuit unit configured to generate a radio-frequency signal for transmitting data and an electric-field-coupling antenna configured to transmit the radio-frequency signal as an electrostatic magnetic field;
   a receiver including an electric-field-coupling antenna and a reception circuit unit configured to receive and process the radio-frequency signal received by the electric-field-coupling antenna; and
   a surface-wave propagation medium configured to provide a surface-wave transmission line to transmit a surface wave emanating from the electric-field-coupling antenna of the transmitter with low propagation loss,
   wherein the surface-wave transmission line includes a plurality of separate dielectrics or magnetic bodies.

2. The communication system according to claim 1, wherein the radio-frequency signal is an ultra-wideband signal using an ultra-wideband.

3. The communication system according to claim 1, wherein the surface-wave transmission line includes a dielectric with a dielectric constant $\in$ greater than a dielectric constant $\in_0$ of air.

4. The communication system according to claim 3, wherein the surface-wave transmission line includes a dielectric whose dielectric constant becomes greater toward an inner part thereof.

5. The communication system according to claim 3, wherein the surface-wave transmission line is embedded in another dielectric with a lower dielectric constant.

6. The communication system according to claim 1, wherein the surface-wave transmission line includes a magnetic body with a magnetic permeability $\mu$ greater than a magnetic permeability $\mu_0$ of air.

7. The communication system according to claim 6, wherein the surface-wave transmission line includes a magnetic body whose magnetic permeability becomes greater toward an inner part thereof.

8. The communication system according to claim 6, wherein the surface-wave transmission line is embedded in another magnetic body with a lower magnetic permeability.

9. The communication system according to claim 1, wherein the receiver rectifies the radio-frequency signal received by the electric-field-coupling antenna and generates electric power.

10. A communication apparatus, comprising:
an apparatus casing;
a communication circuit unit configured to output a radio-frequency signal for transmitting data, the communication circuit unit being accommodated in the apparatus casing;
a resonating section configured to allow the radio-frequency signal output from the communication circuit unit to resonate at a desired frequency, the resonating section being accommodated in the apparatus casing;
a coupling electrode having a central portion connected to the resonating section, the coupling electrode being accommodated in the apparatus casing; and
a surface-wave transmission line disposed in front of the coupling electrode, wherein the surface-wave transmission line captures an electromagnetic field generated in the vicinity of a front side of the coupling electrode and transmits the captured electromagnetic field as a surface wave at an interior of the surface-wave transmission line.

11. The communication apparatus according to claim 10, wherein the surface-wave transmission line captures a surface wave emanating from the coupling electrode and guides the surface wave to a desired region of a surface of the casing.

12. The communication apparatus according to claim 10, wherein the resonating section includes a series inductor and a parallel inductor.

13. A communication system, comprising:
a transmitter including a transmission circuit unit configured to generate a radio-frequency signal for transmitting data and an electric-field-coupling antenna configured to transmit the radio-frequency signal as an electrostatic magnetic field;
a receiver including an electric-field-coupling antenna and a reception circuit unit configured to receive and process the radio-frequency signal received by the electric-field-coupling antenna; and
a surface-wave propagation medium configured to provide a surface-wave transmission line to transmit a surface wave emanating from the electric-field-coupling antenna of the transmitter with low propagation loss,
wherein the surface-wave transmission line includes a dielectric with a dielectric constant $\in$ greater than a dielectric constant $\in_0$ of air, and the dielectric $\in$ constant becomes greater toward an inner part of the transmission line.

14. A communication system, comprising:
a transmitter including a transmission circuit unit configured to generate a radio-frequency signal for transmitting data and an electric-field-coupling antenna configured to transmit the radio-frequency signal as an electrostatic magnetic field;
a receiver including an electric-field-coupling antenna and a reception circuit unit configured to receive and process the radio-frequency signal received by the electric-field-coupling antenna; and
a surface-wave propagation medium configured to provide a surface-wave transmission line to transmit a surface wave emanating from the electric-field-coupling antenna of the transmitter with low propagation loss,
wherein the surface-wave transmission line includes a magnetic body with a magnetic permeability $\mu$ greater than a magnetic permeability $\mu_0$ of air, and the magnetic permeability $\mu$ becomes greater toward an inner part of the magnetic body.

* * * * *